(12) United States Patent
Yildiz et al.

(10) Patent No.: US 12,719,552 B2
(45) Date of Patent: Aug. 25, 2026

(54) 3D BEAMFORMING FOR JOINT PHASE TIME ARRAYS

(71) Applicant: Samsung Electronics Co., Ltd., Suwon-si (KR)

(72) Inventors: Ozlem Yildiz, Brooklyn, NY (US); Ahmad AlAmmouri, Richardson, TX (US); Jianhua Mo, Allen, TX (US); Young Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 18/811,643

(22) Filed: Aug. 21, 2024

(65) Prior Publication Data

US 2025/0070847 A1 Feb. 27, 2025

Related U.S. Application Data

(60) Provisional application No. 63/534,758, filed on Aug. 25, 2023.

(51) Int. Cl.
*H04L 1/02* (2006.01)
*H04B 7/06* (2006.01)

(52) U.S. Cl.
CPC ................................ *H04B 7/06952* (2023.05)

(58) Field of Classification Search
CPC .. H04B 7/0695; H04B 7/0617; H04B 7/0413; H04B 7/0452; H04B 7/088;
(Continued)

(56) References Cited

U.S. PATENT DOCUMENTS 9,236,916 B2 1/2016 Wernersson et al.
9,398,567 B2 7/2016 Jung
(Continued)

FOREIGN PATENT DOCUMENTS

CN 114285443 A 4/2022
WO 2023214645 A1 11/2023

OTHER PUBLICATIONS

International Search Report and Written Opinion issued Dec. 3, 2024 regarding International Application No. PCT/KR2024/012640, 6 pages.

(Continued)

*Primary Examiner* — Khai Tran

(57) ABSTRACT

The disclosed technology can include three dimensional (3D) beamforming for joint phase-time arrays (JTPAs). In some embodiments, a method for operating a BS is provided. The method includes receiving information from a plurality of user equipment (UEs) and identifying, based on the received information, azimuth and elevation information associated with the UEs. The method further includes determining at least two UEs of the plurality of UEs to serve based at least in part on the azimuth and elevation information of the at least two UEs, respectively, determining bandwidth allocations for the at least two UEs, respectively, and determining joint-phase-time array (JPTA) beams for the at least two UEs, respectively, based on the bandwidth allocations and the azimuth and elevation information of the at least two UEs, respectively. The method further includes transmitting information on the JPTA beams to the at least two UEs, respectively.

20 Claims, 15 Drawing Sheets

(58) Field of Classification Search
CPC ... H04L 5/0048; H04L 5/0051; H04L 5/0094; H04L 5/0023; H94W 72/232; H94W 16/28; H94W 72/046
USPC ................................ 375/267, 260, 262, 299
See application file for complete search history.

(56) References Cited

U.S. PATENT DOCUMENTS

| | | | | |
|---|---|---|---|---|
| 2017/0019800 | A1 | 1/2017 | Liu et al. | |
| 2017/0104517 | A1 | 4/2017 | Kakishima et al. | |
| 2017/0195027 | A1 | 7/2017 | Baek et al. | |
| 2017/0310441 | A1 | 10/2017 | Wei et al. | |
| 2022/0085498 | A1 | 3/2022 | Mason et al. | |
| 2022/0385350 | A1 | 12/2022 | Sahoo et al. | |
| 2023/0361823 | A1* | 11/2023 | Mo | H04B 7/0617 |
| 2023/0362671 | A1 | 11/2023 | Mo et al. | |
| 2024/0014881 | A1* | 1/2024 | Zhu | H04L 5/0051 |
| 2024/0056273 | A1* | 2/2024 | Zhu | H04L 5/0023 |
| 2025/0062819 | A1* | 2/2025 | Pick | H04B 7/0628 |

OTHER PUBLICATIONS

Ratnam, V., et al., "Joint Phase-Time Arrays: A Paradigm for Frequency-Dependent Analog Beamforming in 6G", IEEE Access, Vo.10, Jul. 12, 2022, 14 pages.

Boljanovic, V., et al., "Fast Beam Training with True-Time-Delay Arrays in Wideband Millimeter-Wave Systems", IEEE Transactions on Circuits and Systems—I: Regular Papers, vol. 68, No. 4, Apr. 2021, 13 pages.

Jain, I., et al., "Towards Flexible Frequency-Dependent mmWave Multi-Beamforming", International Workshop on Mobile Computing Systems and Applications (HotMobile '23), 2023, 1 page.

Alammouri, A., et al., "Extending Uplink Coverage of mmWave and Terahertz Systems Through Joint Phase-Time Arrays", IEEE Access, vol. 10, Aug. 19, 2022, 13 pages.

Forbes, T., et al., "A 0.2-2 GHz Time-Interleaved Multi-Stage Switched-Capacitor Delay Element Achieving 448.6 ns Delay and 330 ns/mm2 Area Efficiency", IEEE Radio Frequency Integrated Circuits Symposium (RFIC), Jun. 2022, 5 pages.

Wadaskar, A., et. al., "3D Rainbow Beam Design for Fast Beam Training with True-Time-Delay Arrays in Wideband Millimeter-Wave Systems", 55th Asilomar Conference on Signals, Systems, and Computers, IEEE 2021, 8 pages.

Jain, I., et. al., "mmFlexible: Flexible Directional Frequency Multiplexing for Multi-user mmWave Networks", arXiv:2301.10950v1 [eess.SY] Jan. 26, 2023, 17 pages.

* cited by examiner

700

3D BEAMFORMING FOR JOINT PHASE TIME ARRAYS

CROSS-REFERENCE TO RELATED AND CLAIM OF PRIORITY

The present application claims priority under 35 U.S.C. § 119(e) to U.S. Provisional Patent Application No. 63/534,758 filed on Aug. 25, 2023, which is hereby incorporated by reference in its entirety.

TECHNICAL FIELD

The present disclosure relates generally to wireless communication systems and, more specifically, the present disclosure relates to three dimensional (3D) beamforming for joint phase-time arrays (JTPAs).

BACKGROUND

As wireless communication has grown and the number of subscribers to wireless communication services continues to grow quickly, the demand for wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since the deployment of 4G communication systems, and to enable various vertical applications, 5G (e.g., fifth generation) communication systems have been developed and are currently being deployed. Several characteristics of such applications have also been considered.

SUMMARY

The present disclosure relates to 3D beamforming for JTPAs.

In one embodiment, a base station (BS) is provided. The BS includes a transceiver configured to receive information from a plurality of user equipment (UEs). The BS further includes a processor operably coupled to the transceiver. The processor is configured to identify, based on the received information, azimuth and elevation information associated with the UEs. The processor is further configured to determine at least two UEs of the plurality of UEs to serve based at least in part on the azimuth and elevation information of the at least two UEs, respectively. The processor is further configured to determine bandwidth allocations for the at least two UEs, respectively, and determine joint-phase-time array (JPTA) beams for the at least two UEs, respectively, based on the bandwidth allocations and the azimuth and elevation information of the at least two UEs, respectively. The transceiver is further configured to transmit information on the JPTA beams to the at least two UEs, respectively.

In another embodiment, a method for operating a BS is provided. The method includes receiving information from a plurality of UEs and identifying, based on the received information, azimuth and elevation information associated with the UEs. The method further includes determining at least two UEs of the plurality of UEs to serve based at least in part on the azimuth and elevation information of the at least two UEs, respectively, determining bandwidth allocations for the at least two UEs, respectively, and determining JPTA beams for the at least two UEs, respectively, based on the bandwidth allocations and the azimuth and elevation information of the at least two UEs, respectively. The method further includes transmitting information on the JPTA beams to the at least two UEs, respectively.

In yet another embodiment, a non-transitory computer readable medium includes program code that, when executed by a processor of a BS, causes the BS to receive information from a plurality of UEs and identify, based on the received information, azimuth and elevation information associated with the UEs. The non-transitory computer readable medium further includes program code that, when executed by a processor of a BS, causes the BS to determine at least two UEs of the plurality of UEs to serve based at least in part on the azimuth and elevation information of the at least two UEs, respectively, determine bandwidth allocations for the at least two UEs, respectively, and determine JPTA beams for the at least two UEs, respectively, based on the bandwidth allocations and the azimuth and elevation information of the at least two UEs, respectively. The non-transitory computer readable medium further includes program code that, when executed by a processor of a BS, causes the BS to transmit information on the JPTA beams to the at least two UEs, respectively.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
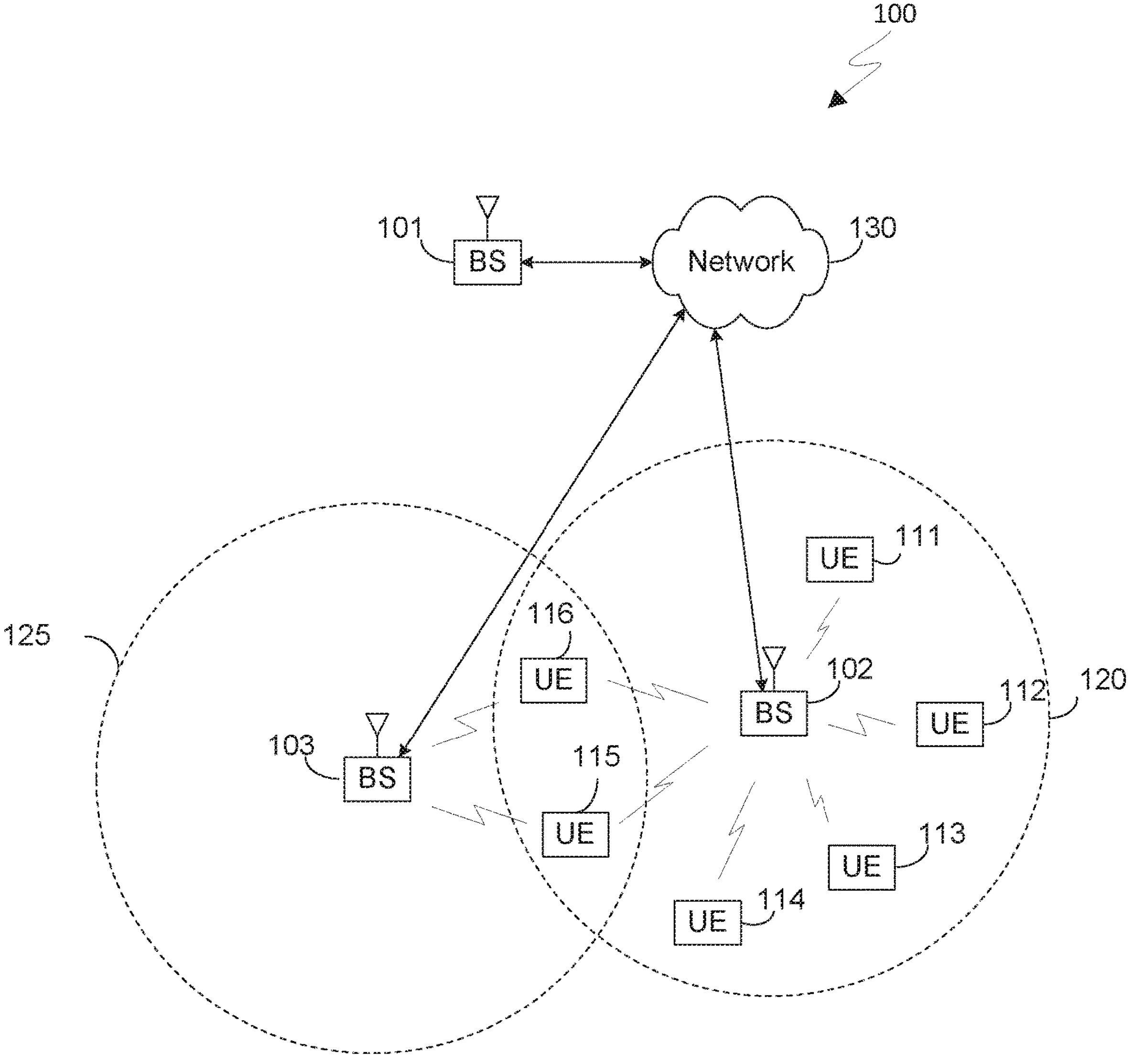
FIG. 1 illustrates an example wireless network according to embodiments of the present disclosure.

FIGS. 1-16, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since the deployment of 4G communication systems, efforts have been made to develop an improved 5G or pre-5G communication system. Therefore, the 5G or pre-5G communication system is also called a "beyond 4G network" or a "post LTE system."

The 5G communication system is implemented in higher frequency (mmWave) bands, e.g., 60 GHz bands, to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is underway based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to the deployment of 5G communication systems, 6G or even later releases which may use terahertz (THz) bands.

The following documents are hereby incorporated by reference into the present disclosure as if fully set forth herein: [1]V. Boljanovic et al., "Fast Beam Training with True-Time-Delay Arrays in Wideband Millimeter-Wave Systems," in IEEE Transactions on Circuits and Systems I: Regular Papers, vol. 68, no. 4, pp. 1727-1739, April 2021, doi: 10.1109/TCSI.2021.3054428; [2]I. Jain, et al., "Towards Flexible Frequency-Dependent mmWave Multi-Beamforming" International Workshop on Mobile Computing Systems and Applications (HotMobile '23), 2023, doi: 10.1145/3572864.3581579; [3]A. Alammouri et al., "Extending Uplink Coverage of mmWave and Terahertz Systems Through Joint Phase-Time Arrays," in IEEE Access, vol. 10, pp. 88872-88884, 2022, doi: 10.1109/ACCESS.2022.3200334; [4]V. V. Ratnam et al., "Joint Phase-Time Arrays: A Paradigm for Frequency-Dependent Analog Beamforming in 6G," in IEEE Access, vol. 10, pp. 73364-73377, 2022, doi: 10.1109/ACCESS.2022.3190418; [5]B. Ng, J. Mo, J. Zhang, V. Rantam, A. AlAmmouri "Mobility Robustness Enhancement with Joint Phase-Time Arrays", U.S. Publication No. 2023/0362671, 2023; and [6]T. Forbes, B. Magstadt, J. Moody, A. Suchanek, and S. Nelson, "A 0.2-2 GHz Time-Interleaved Multi-Stage Switched-Capacitor Delay Element Achieving 448.6 ns Delay and 330 ns/mm2 Area Efficiency," in 2022 *IEEE Radio Frequency Integrated Circuits Symposium* (RFIC), June 2022, pp. 135-138.

Figure 2:
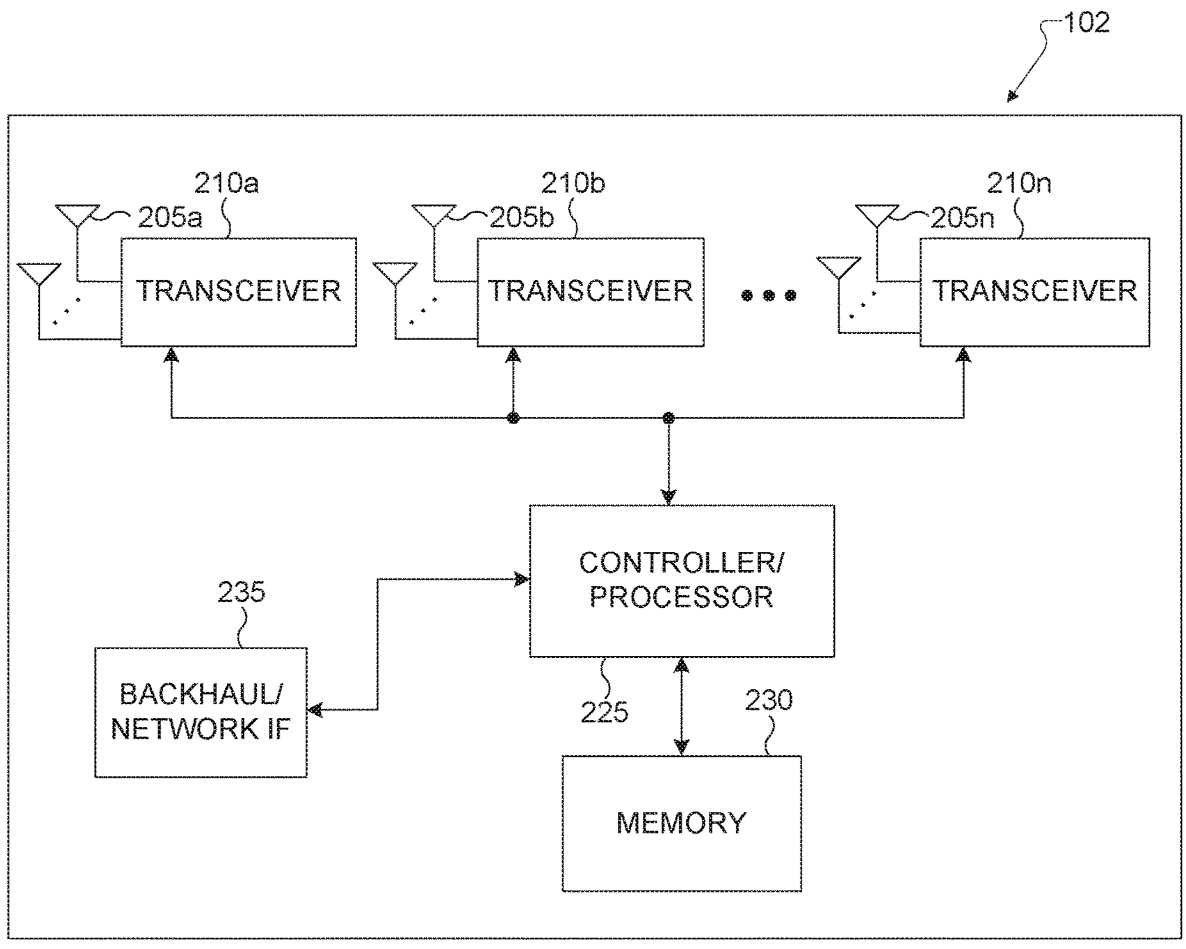
FIG. 2 illustrates an example BS according to embodiments of the present disclosure.
Figure 3:
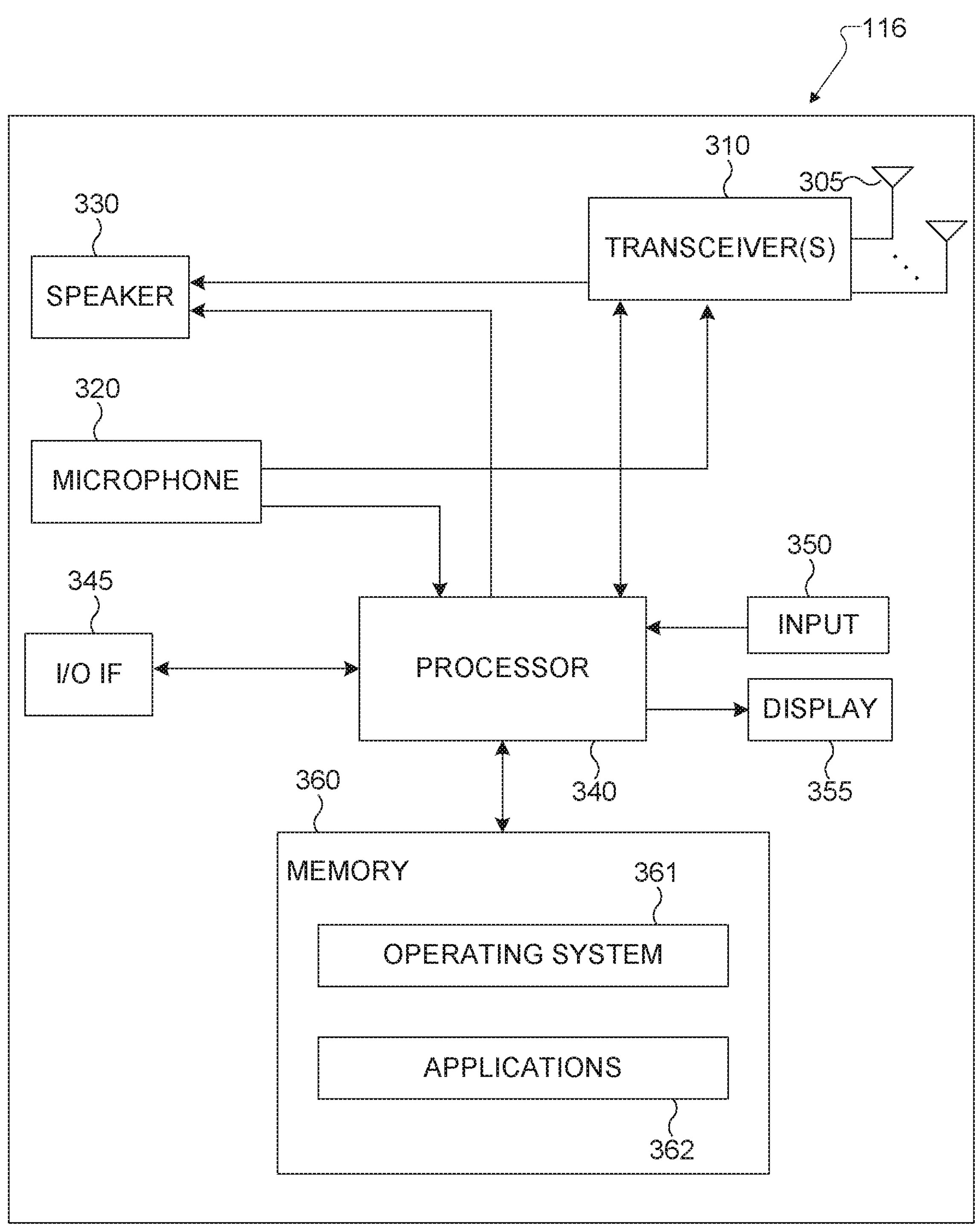
FIG. 3 illustrates an example of a UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or another data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing mobility robustness enhancements with 3D JTPA beamforming. In certain embodiments, one or more of the gNBs 101-103 include circuitry, programing, or a combination thereof to provide 3D beamforming for JTPAs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as processes for 3D beamforming for JTPAs as described in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. For example, in various embodiments, the UE 116 uses 3D beamformed JTPA beams for DL receptions from eNB 102 and/or 103 for mobility robustness.

In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
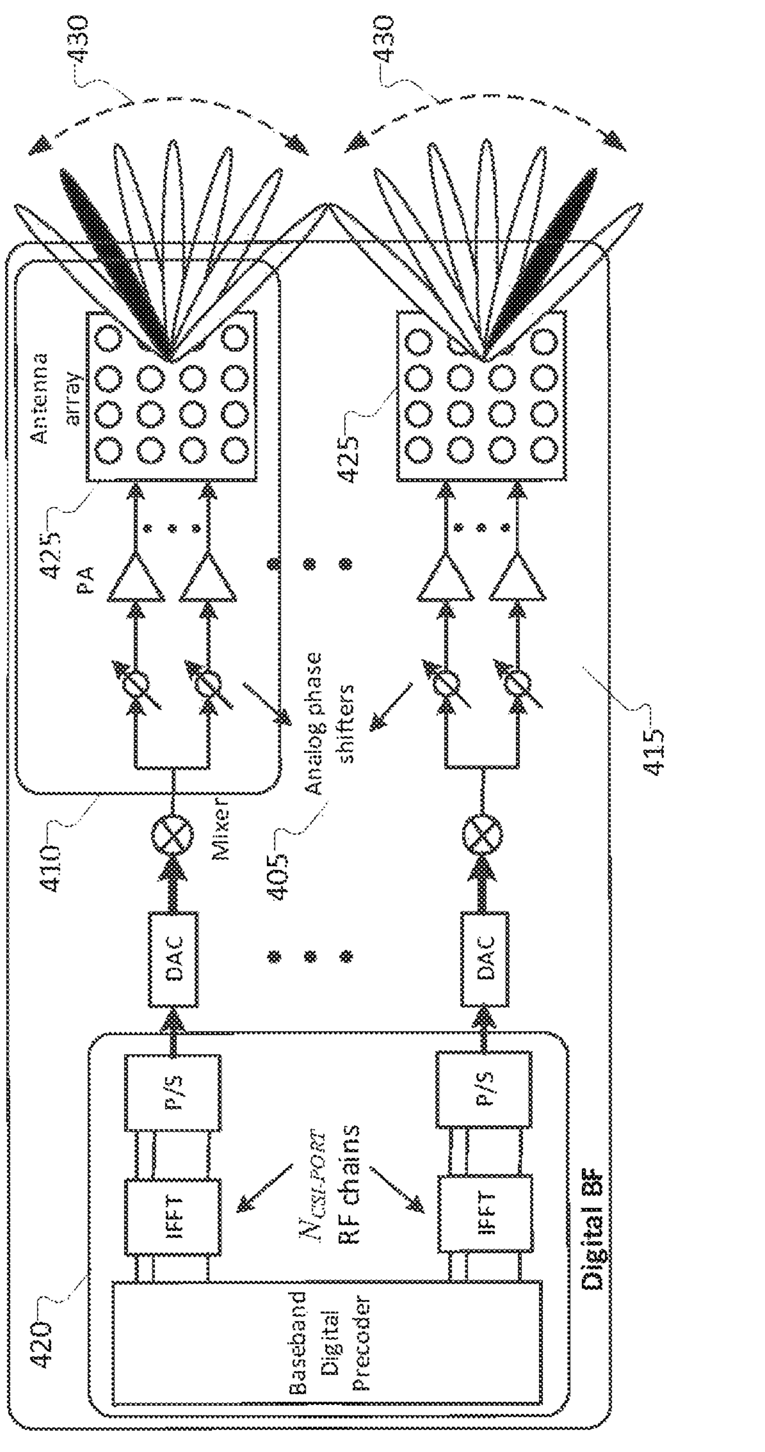
FIG. 4 illustrates an example of a transmitter structure for beamforming according to embodiments of the present disclosure.

FIG. 4 illustrates an example of a transmitter structure 400 for beamforming according to various embodiments of the present disclosure. The non-limiting embodiment of the transmitter structure 400 illustrated in FIG. 4 is for illustration only. FIG. 4 does not limit the scope of this disclosure to any particular implementation of the transmitter structure 400. In certain embodiments, one or more of gNB 102 or UE 116 include the transmitter structure 400. For example, one or more of antenna 205 and its associated systems or antenna 305 and its associated systems can be included in transmitter structure 400.

In the example shown in FIG. 4, the transmitter structure 400 includes analog phase shifters 405, an analog beamformer (BF) 410, a hybrid BF 415, a digital BF 420, and one or more antenna arrays 425. In this case, one antenna port is mapped onto many antenna elements in antenna arrays 425, which can be controlled by the bank of analog phase shifters 405. One antenna port can then correspond to one sub-array which produces a narrow analog beam through analog beamforming by analogy BF 410. The analog beam can be configured to sweep 430 across a wider range of angles by varying the phase shifter bank 405 across symbols or subframes.

Analog beamforming relies on analog hardware such as phase-shifters and switches to create the beam shapes. However, these analog hardware components create a frequency-flat response. All components of the input signal frequency undergo a similar transformation after passing through them. This reduces the flexibility of the beamforming that is possible.

Embodiments of the present disclosure recognize that, due to the rising demand for traffic, wireless systems are moving towards higher frequency of operation, such as millimeter-wave (mm-wave) and terahertz (THz) frequencies, where abundant spectrum is available. However, the higher frequencies also suffer from a high channel propagation loss, and therefore require a large antenna array to create sufficient beamforming gain to ensure sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as analog-to-digital converters (ADCs) and/or digital-to-analog converters (DACs) also grows tremendously. Thus, fully digital transceiver implementations, where each antenna element is fed by a dedicated radio-frequency (RF) chain, may not be practical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction.

Accordingly, various embodiments of the present disclosure utilize frequency-dependent hybrid beamforming, which can be referred to as joint phase time array (JPTA) beamforming. Note that, here, frequency-dependent beamforming can refer to a technique where different components of the input signal may encounter a differently shaped analog beam based on their frequency.

Figure 5:
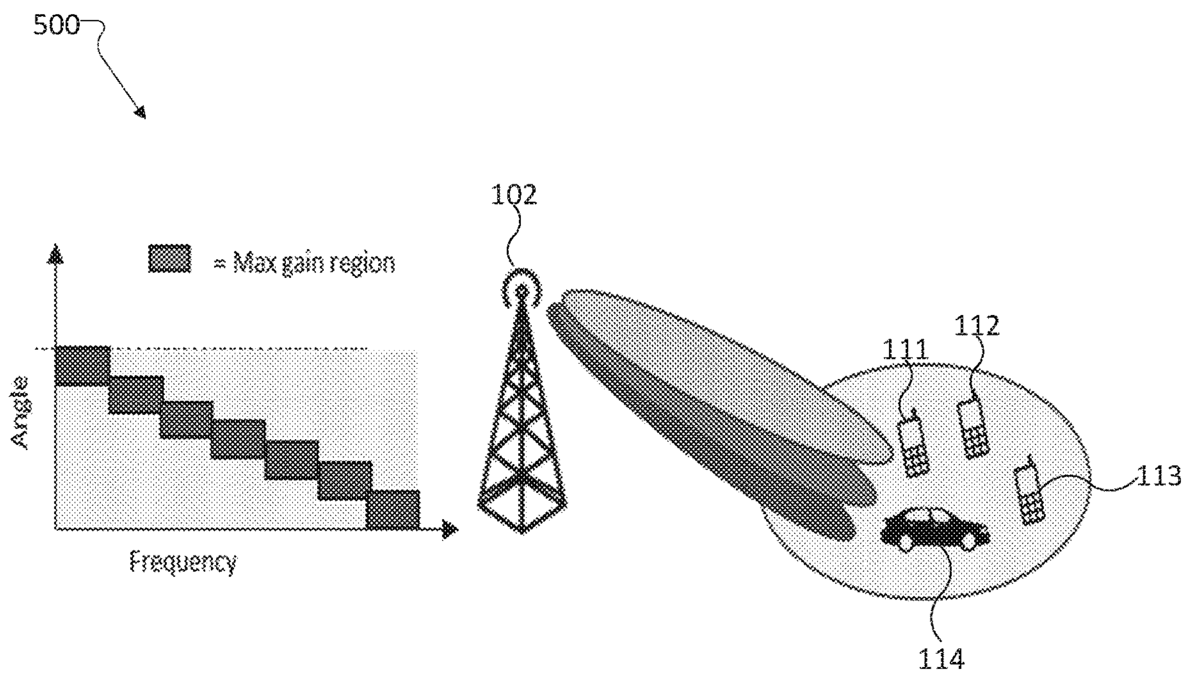
FIG. 5 illustrates an example of a JPTA beamforming according to embodiments of the present disclosure.

FIG. 5 illustrates an example of a JPTA beamforming 500 according to various embodiments of the present disclosure. For example, the JPTA beamforming 500 provides an example of the frequency varying linearly over the system bandwidth and the angular direction sweeping linearly over a certain region according to embodiments of the present disclosure. For example, the JPTA beamforming 500 may be performed in network 130 by BS 102. The JPTA beamforming 500 is for illustration only and other embodiments can be used without departing from the scope of the present disclosure.

In one example behavior of JPTA operation, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0-\Delta\theta/2, \theta_0+\Delta\theta/2]$, as shown in FIG. 5. Embodiments in this disclosure can be applied to other behaviors of JPTA operation as well.

Figure 6:
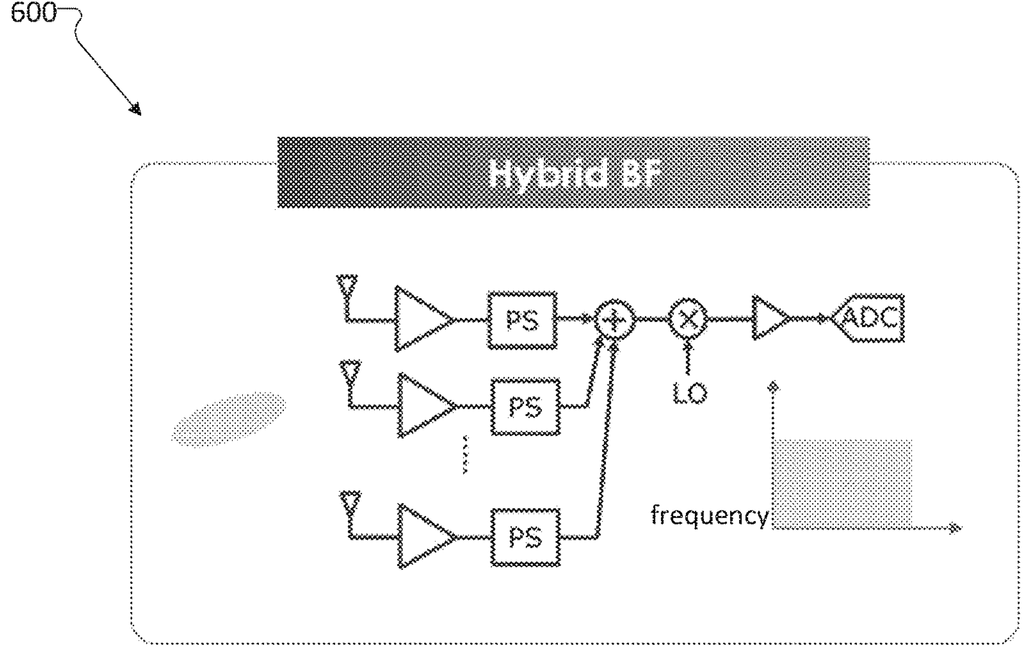
FIG. 6 illustrates a diagram of an example phase-shifter based frequency-flat hybrid beamforming according to embodiments of the present disclosure.

FIG. 6 illustrates a diagram of an example phase-shifter based frequency-flat hybrid beamforming 600 according to embodiments of the present disclosure.

With reference to FIG. 6, some approaches can use a phase-shifter array or a combination of phase-shifters and switches to connect the large antenna array to a few of RF chains.

For example, with reference to FIG. 4, the case of hybrid beamforming at a base-station (BS) with a single RF chain, i.e., R=1, is evaluated. With reference to FIG. 5, note that with M antennas, the maximum beamforming gain in any direction is M. For the BS (e.g., the BS 102) to provide signal coverage to the UEs in the cell, the BS would perform beam sweeping over time for its frequency-flat beams.

However, with reference to FIG. 6, some approaches can use a phase-shifter array or a combination of phase-shifters and switches to connect the large antenna array to a few of RF chains.

Figure 7:
FIG. 7 illustrates a diagram of an example JPTA circuit according to embodiments of the present disclosure.
Figure 7:
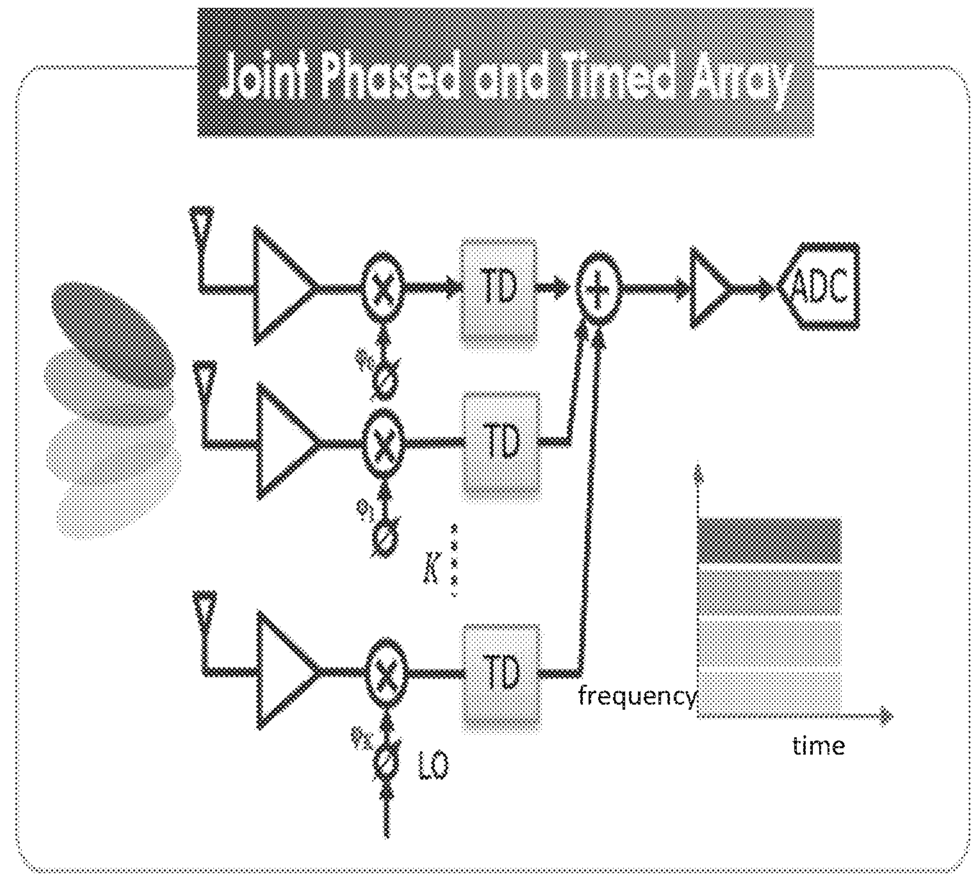

FIG. 7 illustrates a diagram of an example JPTA circuit 700 according to embodiments of the present disclosure. For example, the JPTA circuit 700 may be implemented in the BS 102. This example is for illustration only and other embodiments can be used without departing from the scope of the presence disclosure.

In some cases, an alternative to frequency-flat hybrid beamforming is frequency-dependent hybrid beamforming, called joint phase-time array (JPTA) beamforming. Note that, here, frequency-dependent beamforming can refer to a technique where different components of the input signal may encounter a differently shaped analog beam based on their frequency. To this end, with reference to FIG. 7, delay elements are utilized in addition to the common phase shifters to create the desired frequency-dependent beam.

By tuning the delay elements and phase shifters, different frequency-dependent beams can be designed. For example, in various embodiments, a rainbow beam (i.e., continues-angle or prism beam) can be designed. For this design, every azimuth angle is covered by a bundle of subcarriers with a high beam gain. This design is especially useful for beam training or for data multiplying when the cell is highly loaded (many UEs at different angles are associated with the BS). In another design case, the BS designs the JPTA to maximize the beam gain for UEs at different angles over distinct continuous sets of subcarriers. For data transmission, this design can be more useful since it can be tailored based on the locations of the UEs and is beneficial even if only two UEs are served by the BS.

In contrast to the phased-array beamforming shown in FIG. 5, UEs at different angles can be served at the same over distinct bundles of sub-carriers without the need for beam sweeping. For example, UEs at [−30, −15, 15, 30] can be simultaneously served over the corresponding subcarrier (i.e., frequency sub-bands). As a result, every UE has access to the channel, which can be exploited for different purposes including fast beam-training, uplink coverage extension, and mobility enhancement.

To design the beams described herein, the disclosed technology can provide different approaches. For the rainbow beam, there can be a solution where the delays are set with a constant increment between them. Hence, the complexity for designing this kind of beam is very low. For the discrete-angle beam type, there can also be different approaches. In some cases, an iterative approach is provided which yields high beam gains, while an analytical approach can also be used. The beam gain for the iterative approach is typically higher than the analytical approach, but at the price of high complexity. Regardless of which approach or algorithm is used to design the JPTA beam, the output is in the form of phases and delays that are used to configure the delay elements and the phase shifters in order to achieve the desired beam pattern.

While the present disclosure provides a cellular network where the JPTA beam is designed at the BS side, it is not limited to this application. The present disclosure could be applied to other systems such as WiFi as well as designing beams at the UE (e.g., the UE 116) side.

In some instances, there can be 2D beamforming, where JPTA can be used to create frequency-dependent in either the azimuth or horizontal domain as shown in FIG. 7. From the hardware perspective, each column or row in the planar antenna array is connected to a single delay element. Furthermore, the delay elements are used to construct the desired beam pattern, e.g., FIG. 7, while the phase shifters are used to point the beam vertically (or in the elevation domain) towards the desired UEs.

In some cases, while such an approach reduces the number of used delay elements, it can limit the usability of JPTA to serve UEs in the cell, since UEs at different distances from the BS (i.e., different elevation angles) with the same azimuth angle cannot be served simultaneously. Moreover, UEs need to be located with about the same elevation angles to be able to be served simultaneously.

In some instances, the benefits from using JPTA relative to the typical phased arrays increase with the number of UEs that can be simultaneously served by the BS. Hence, it may be important to be able to perform 3D JPTA beamforming, where UEs can be served simultaneously if they are separately in the azimuth or elevation domains.

Another important aspect is the time and complexity of the beam design. In general, various embodiments can include (i.e., but is not limited to) two options, online and offline beam designs. In online beamforming, the BS designs the beam based on the location of the desired UEs and their bandwidth requirement. Embodiments of the present disclosure recognize that the complexity of the beam design algorithm needs to be small (i.e., simple algorithms). For offline designs, the BS has a set of predetermined beams that the BS picks from in order to configure the JPTA's delay elements and phase shifters. In this case, the complexity of algorithm does not matter as long as there is a good beam design for active users inside the set of the beam codebooks.

Furthermore, the provided algorithms have the flexibility to provide high beam gains for UEs over a bandwidth that is proportional to their requirement. For example, equal BW is assigned for each UE, but this needs to be relaxed to enhance the flexibility and usability of JPTA beamforming.

In some cases, an online design is preferred since the BS can tailor the beam based on the desired UEs and their BW requirements. Hence, various embodiments of the present disclosure provide different designs that cover the online and offline beamforming cases.

The present disclosure provides different algorithms and solutions that vary in terms of complexity, flexibility, and performance. Solutions cover different scenarios for JPTA, including (i.e., but not limited to) online and offline design, flexible bandwidth assignment, 3D and 2D beamforming, etc.

In some embodiments, BS generates 3D beamforming with JPTA to serve multiple users at their allocated bandwidths simultaneously. The azimuth and elevation angles could be different from each other. The bandwidth allocation could be uniform or non-uniform.

In some embodiments, given the UE's (e.g., the UE 116) azimuth and elevation angles, and their BW requirements, the disclosed technology can solve the JPTA beamforming using an analytical approach that has very low complexity, and hence can be used by the BS online to design the JPTA beam. Then depending on the BS capability, the solution is further refined to provide higher beam gain. The second step is also applicable to the offline beam design case discussed herein, where the BS has a set of predefined beams, i.e., codebook, designed offline, that it can pick from to configure the JPTA beam.

In some embodiments, the JPTA beam is jointly designed regarding the delay elements and phase shifters in elevation and azimuth. In some embodiments, the beam is designed separately for the elevation and azimuth, then combined at the last step.

Figure 8:
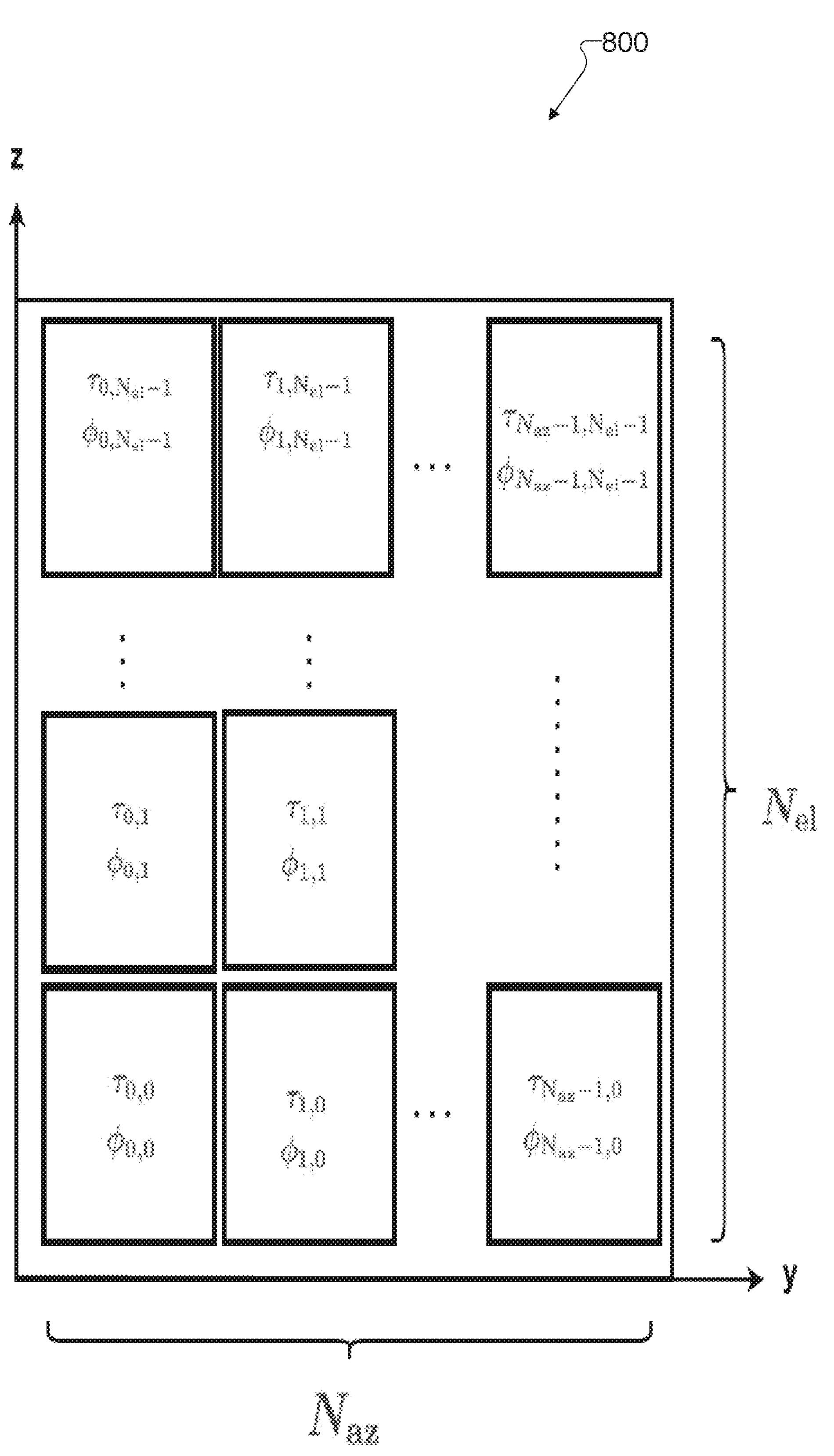
FIG. 8 illustrates a diagram of an example planar antenna array structure according to embodiments of the present disclosure.

FIG. 8 illustrates a diagram of an example planar antenna array structure 800 according to embodiments of the present disclosure. For example, planar antenna array structure 800 can be implemented in the BS 103 of FIG. 1. This example is for illustration only and other embodiments can be used without departing from the scope of the present disclosure.

A planar joint phase-time array with a size $N_{az}\times N_{el}$ is placed in the y-z plane. With reference to FIG. 8, each antenna is connected to one delay element and one phase shifter as shown. The delay and phase values for each antenna located at (y, z) is denoted as $\tau_{y,z}$ and $\varphi_{y,z}$.

Figure 9:
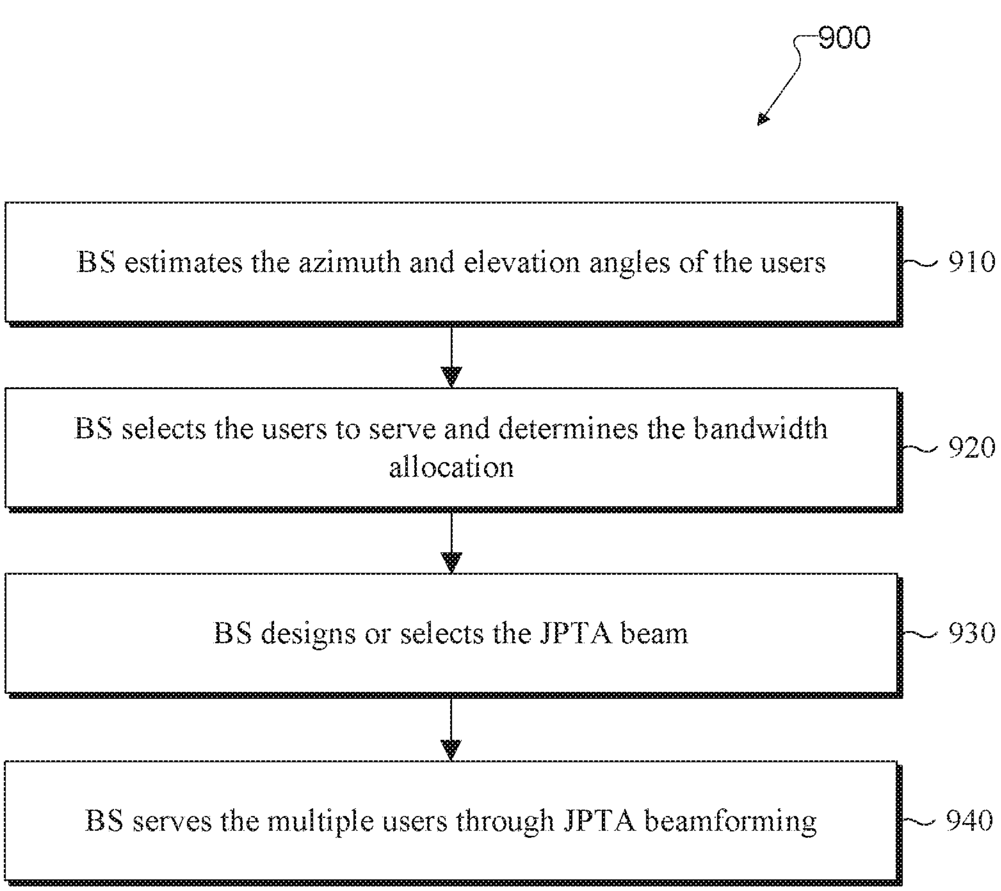
FIG. 9 illustrates a flowchart of an example BS procedure for operation of 3D beamforming with JPTA according to embodiments of the present disclosure.

FIG. 9 illustrates a flowchart of an example BS procedure 900 for operation of 3D beamforming with JPTA according to embodiments of the present disclosure. For example, BS procedure 900 for operation of 3D beamforming with JPTA may be performed by the BS 102 of FIG. 2. This example is for illustration only and other embodiments can be used without departing from the scope of the present disclosure.

The procedure begins in 910, a BS estimates the azimuth and elevation angles of the users. In 920, the BS selects the users to serve and determines the bandwidth allocation. In 930, the BS designs or selects the JPTA beam. In 940, the BS serves the multiple users through JPTA beamforming.

In some embodiments, a BS generates 3D beamforming with JPTA to serve multiple users at their allocated bandwidths simultaneously. The BS first estimates the azimuth and elevation angles of the users. This can be done by reference signaling (e.g., synchronization signal block (SSB), channel state information reference signal (CSI-RS), sounding reference signal (SRS)), and/or UE reporting (e.g., precoder matrix indicator (PMI) reporting, layer 1 reference signal received power (L1-RSRP) reporting). The BS then selects the users to serve and determines the bandwidth allocations. This can be done according to the proportional fairness metric. In some instances, the users with large azimuth and elevation angle differences are preferred since it generally facilitate the JPTA beam design. The bandwidth allocation could be uniform or non-uniform. The BS can then design online the JPTA beamforming or select one JPTA beam from a predetermined JPTA beam codebook. Lastly, the BS serves the multiple users through JPTA beamforming.

A goal is to maximize the beamforming gain for every user at their allocated subcarriers. The problem could be defined as $$\max_{\tau_{z,y},\varphi_{z,y}} G_{z,y}(\tau_{z,y}, \varphi_{z,y}, \theta_{az}^m, \theta_{el}^m, f_m)$$

for a fixed antenna at (y, z)-th location, where, $\tau_{y,z}$ and $\varphi_{y,z}$ are the delay and phase values for (y, z)-th antenna; $f_m$ is the mth subcarrier frequency; and $$\theta_{az}^m, \theta_{el}^m$$

are angle of arrival in azimuth and elevation of the user which is assigned to mth subcarrier frequency.

The beamforming gain for a subcarrier $f_m$ is defined as $$G = \frac{1}{N_{az}N_{el}}\left\|w(f_m)^H a_R(\theta_{az}^m, \theta_{el}^m, f_m)\right\|^2,$$

where $w(f_m)$ is the beamforming vector and $$a_R(\theta_{az}^m, \theta_{el}^m, f_m)$$

is the array steering vector. The array steering vector and the beamforming vector are defined as $$[a_R(\theta_{az}^m, \theta_{el}^m, f_m)]_{y,z} = e^{-j\pi\frac{f_m}{f_c}(ysin\theta_{az}^m,sin\theta_{el}^m+zcos_{el}^m)}$$

$$[w(f_m)]_{y,z} = e^{j\varphi_{y,z}+j2\pi f_m\tau_{y,z}}$$

for $y \in [0, N_{az}-1]$ and $z \in [0, N_{el}-1]$. This leads to the following beamforming gain expression $$G(\tau_{y,z}, \varphi_{y,z}, \theta_{az}^m, \theta_{el}^m, f_m) = \frac{1}{N_{az}N_{el}}\left\|\sum_{z=0}^{N_{el}-1}\sum_{y=0}^{N_{az}-1} e^{j\varphi_{y,z}+j2\pi f_m\tau_{y,z}} e^{-j\pi\frac{f_m}{f_c}(ysin\theta_{az}^m sin\theta_{el}^m+zcos\theta_{el}^m)}\right\|^2.$$

In various embodiments, it is expected that $$\frac{f_m}{f_c} \approx 1,$$

which is the case for typical LTE and 5G systems. Since there are $N_{users}$ users, various embodiments assign $\alpha_i \times (M+1)$ subcarriers to (i)-th user. It leads to $$\theta_{az}^m = \theta_{az,i},$$

where $\theta_{az,i}$ is the angle of arrival in azimuth direction for the (i)-th user, for $m \in [\alpha_{i-1}, \alpha_i) \times (M+1)$ and similarly, $$\theta_{el}^m = \theta_{el,i}.$$

In various embodiments, $$\zeta_{y,z}^i \triangleq \pi(y\sin\theta_{az,i}\sin\theta_{el,i} + z\cos\theta_{el,i})$$

for (i)-th user. It can be stated that the maximum gain can be achieved if $$\varphi_{y,z} + 2\pi f_m\tau_{y,z} = \zeta_{y,z}^i$$

for every (y, z)-th antenna across different frequencies. Therefore, various embodiments can construct linear system of equations for (y, z)-th antenna as $Ax_{y,z}=b_{y,z}$ for $$A = \begin{bmatrix} 1 & \frac{-M}{2} \\ 1 & \frac{-M}{2}+1 \\ \vdots & \vdots \\ 1 & \frac{M}{2} \end{bmatrix},$$

$$[b_{y,z}]_m = 2\pi k_i + \zeta_{y,z}^i$$

$$x_{y,z} = [\ \varphi_{y,z} \quad 2\pi\Delta_f\tau_{y,z}\ ]^T$$

by using $$k_i = k_{i-1} + \left\lfloor \frac{\zeta_{y,z}^{i-1} - \zeta_{y,z}^i}{2} \right\rfloor$$

for $i>1$ and $k_1=0$, which is used to keep the antenna phase change between different subcarriers less than 2w. Since this is an overdetermined linear system of equations, in various embodiments the norm of the error, $e_{y,z}=Ax_{y,z}-b_{y,z}$, can be minimized.

The joint optimization problem described herein could have different solutions according to the definition of the norm of error. An expectation is to benefit from least squares approximation, which is defined as $$\min_{\tau_{y,z},\varphi_{y,z}} \|e\|^2$$

because this method leads to a closed form solution. The closed form solution for least squares approximation is $$x_{y,z}^{LS} = (A^TA)^{-I}A^Tb_{y,z}.$$

This leads to the following $$\varphi_{y,z} = \sum_{i=1}^{N_{users}} \alpha_i(\zeta_{y,z}^i + 2\pi k_i)$$

$$\tau_{y,z} = \sum_{i=1}^{N_{users}} \frac{3\alpha_i}{\pi(M+1)\Delta_f}(\zeta_{y,z}^i + 2\pi k_i)\sum_{d=1}^{i}(2\alpha_d - \alpha_i - 1).$$

Figure 10:
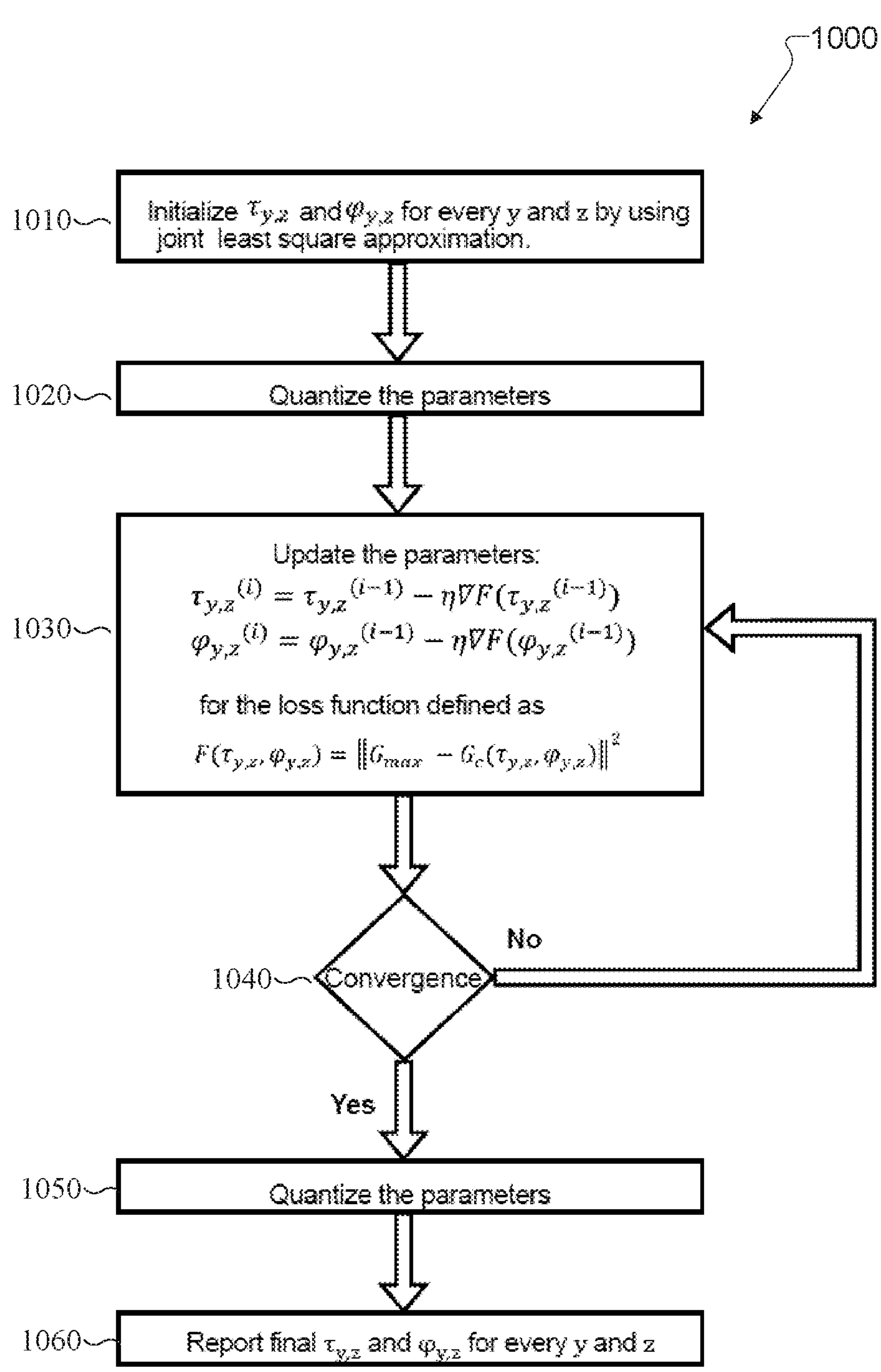
FIG. 10 illustrates a flowchart of an example BS procedure for optimizing parameters for 3D beamforming with JPTA according to embodiments of the present disclosure.

FIG. 10 illustrates a flowchart of an example BS procedure 1000 for optimizing parameters for 3D beamforming with JPTA according to embodiments of the present disclosure. For example, BS procedure 1000 for optimizing parameters for 3D beamforming with JPTA may be performed by any of the BSs 102-103 of FIG. 1, such as the BS 103. This example is for illustration only and other embodiments can be used without departing from the scope of the present disclosure.

The procedure begins in 1010, $\tau_{y,z}$ and $\varphi_{y,z}$ are initialized for every y and z by using a joint least square approximation. In 1020, the parameters are quantized. In 1030, parameters $\tau_{y,z}^{(i)}$ and $\varphi_{y,z}^{(i)}$ are updated for the loss function defined as $\Delta$ $$F(\tau_{y,z},\varphi_{y,z})=\|G_{max}-G_c(\tau_{y,z},\varphi_{y,z})\|^2$$

In 1040, the procedure may converge. If the procedure does not converge, then the procedure returns to 1030. Otherwise, if the procedure does converge, then, in 1050, the parameters are quantized. In 1060, the final $\tau_{y,z}$ and $\varphi_{y,z}$ for every y and z are reported.

Since the analytical approach can lead to a local minimum, various embodiments evaluate iterative algorithms to improve the closed form solutions further. Thus, various embodiments take advantage of gradient descent algorithm, which is an iterative optimization technique that updates the parameters according to their gradients from the defined loss function.

Since a goal of this problem is to maximize the beamforming gain of the users and the upper bound for the G is known due to the antenna numbers, various embodiments define the loss function as the mean squared error of the obtained loss and the beamforming gains of the users. Therefore, the loss function is $$F(\tau_{y,z},\varphi_{y,z})=\|G_{max}-G_c(\tau_{y,z},\varphi_{y,z})\|^2$$

in which c∈[mean, log-mean] to define the different optimization functions and $G_{max}=10\log_{10}N_{az}\lambda N_{el}$ for log-mean, otherwise, $G_{max}=N_{az}\lambda N_{el}$. The definition of $G_C$ could be, but not limited to, as follows:

$$G_{mean}=\frac{1}{|N_{users}|}\sum_{i=1}^{N_{users}}\frac{1}{|\mathcal{M}_i|}\sum_{m\in\mathcal{M}_i}G(\theta_{az,i}\theta_{el,i},m)$$

$$G_{log-mean}=\frac{1}{|N_{users}|}\sum_{i=1}^{N_{users}}10\log_{10}\left(\frac{1}{|\mathcal{M}_i|}\sum_{m\in\mathcal{M}_i}G(\theta_{az,i}\theta_{el,i},m)\right)$$

$$G_{log=}\frac{1}{|N_{users}|}\sum_{i=1}^{N_{users}}\frac{1}{|\mathcal{M}_i|}\sum_{m\in\mathcal{M}_i}10\log_{10}G(\theta_{az,i}\theta_{el,i},m)$$

Therefore, the current optimization can be stated as $$\min_{\tau_{y,z},\varphi_{y,z}}F(\tau_{y,z},\varphi_{y,z})$$

The initialization of the gradient descent could be the closed-form solution given in joint analytical least squares solution given herein. In some cases, the algorithm can be implemented in PyTorch by using built-in features to calculate the gradient and learning rate can be scheduled using Adam optimizer.

Since the realization of delay, $\tau_{y,z}$, and phase, $\varphi_{y,z}$, quantization the results before the gradient descent updates are applied and after the updates are completed. The range of the delay values that are allowed is from 0 to $\tau_{max}$ ns with a precision of $\tau_{prec}$ ns and phase values are represented in β bits. For example, $\tau_{max}$=200 ns, $\tau_{prec}$=2.5 ns, and β=6.

In various embodiments, the updates can be finished when the maximum number of updates defined is reached or when the algorithm reaches the stopping criterion. If the loss function at step n is $F^n$, then convergence is declared if $|F^n-F^{n-1}|<\propto F^n$.

With reference to FIG. 10, the diagram for the gradient descent optimization is shown.

In some embodiments, the analytical solution can be used by itself (i.e., without the gradient descent optimization) in the case of the online beam design especially if the BS (e.g., the BS 102) does not have the capability or the processing power to further optimize the beam using the gradient descent optimization. For the offline beam design case, the gradient descent can be used on top of the analytical solution to further enhance the beam design.

Joint analytical problem, which is explained in a previous embodiment can be solved by changing the problem statement to indicate a different norm for the error, e. While solving by using the norm 2 of e, various embodiments ensure that the mean of the squared error is minimized but because of the virtue of the design, it does not ensure the fairness between different users. For this purpose, various embodiments can take advantage of infinity norm. The problem statement is $$\min_{\tau_{y,z},\varphi_{y,z}}\|e\|_\infty$$

since the definition of infinity norm is $$\|e\|_\infty=\max_i|e_i|.$$

It leads to minimizing the maximum error, which is increasing the fairness between the users. However, it may not lead to a closed form solution; various embodiments solve this iteratively by using CVX tool in MATLAB.

Figure 11:
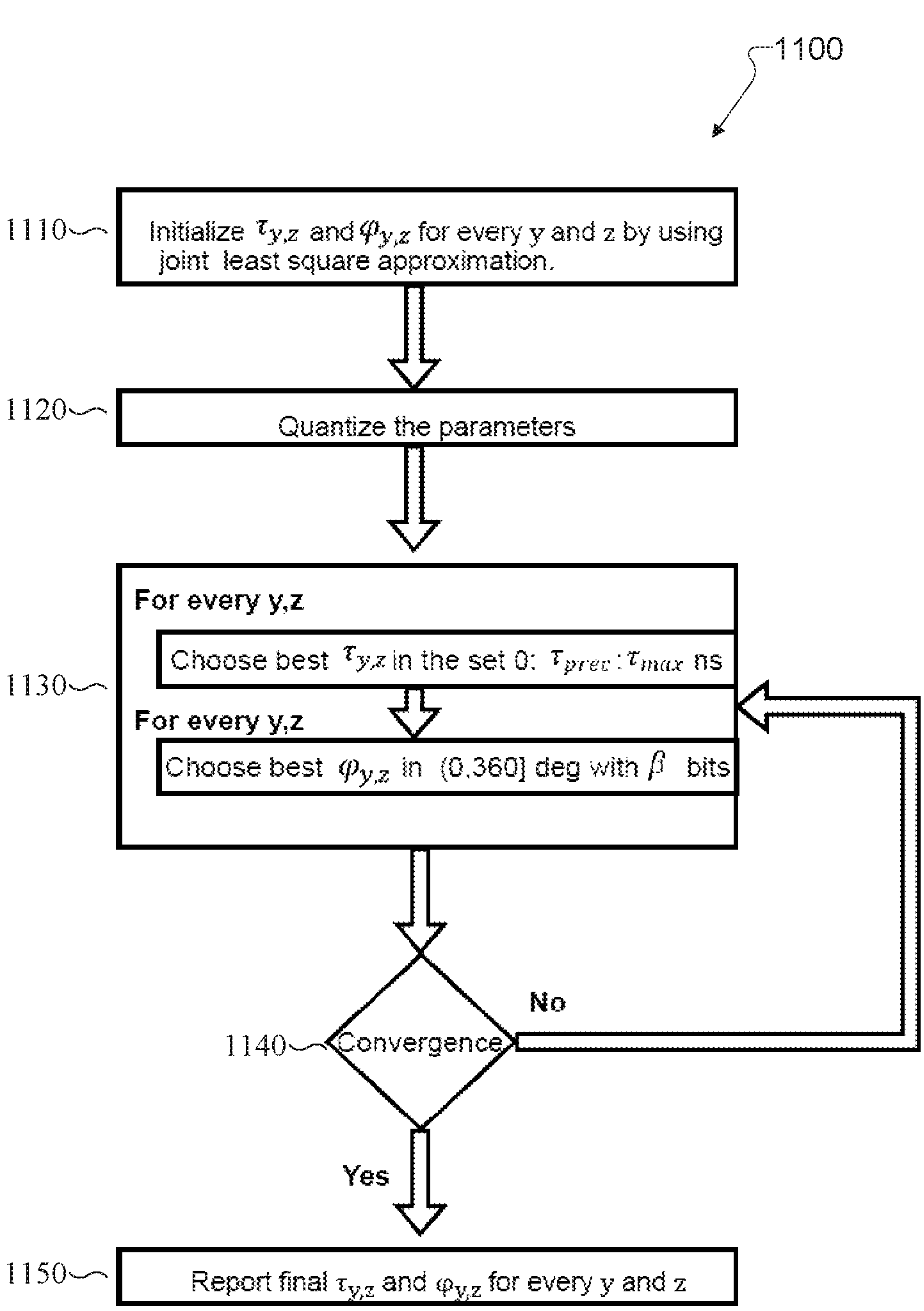
FIG. 11 illustrates a flowchart of an example BS procedure for optimizing parameters for 3D beamforming with JPTA according to embodiments of the present disclosure.

FIG. 11 illustrates a flowchart of an example BS procedure 1100 for optimizing parameters for 3D beamforming with JPTA according to embodiments of the present disclosure. For example, BS procedure 1100 for optimizing parameters for 3D beamforming with JPTA may be performed by any of the BSs 102-103 of FIG. 1, such as the BS 102. This example is for illustration only and other embodiments can be used without departing from the scope of the present disclosure.

The procedure begins in 1110, $\tau_{y,z}$ and $\varphi_{y,z}$ are initialized for every y and z by using a joint least square approximation. In 1120, the parameters are quantized. In 1130 for every y and z, the best $\tau_{y,z}$ is chosen in the set 0: $\tau_{prec}$: $\tau_{max}$ ns and the best $\varphi_{y,z}$ in (0,360] deg with β bits. In 1140, the procedure may converge. If the procedure does converge, then, in 1150, the final $\tau_{y,z}$ and $\varphi_{y,z}$ for every y and z are reported. Otherwise, if the procedure does not converge, the procedure returns to 1130.

To determine if there are better results after the joint analytical least squares solution, with reference to FIG. 11, a greedy optimization approach is taken advantage of, which is also iterative. The starting point of the algorithm is the closed form solutions given in analytical least squares solution. The values as described in joint gradient descent optimization are quantized. For every y and z, a search for any values that are allowed in quantization leads to a better performance for $\tau_{y,z}$ is done. The performance is measured by two different metrics: $G_{mean}$ and $G_{log-mean}$. Therefore, the problem statement is $$\min_{\tau_{y,z},\varphi_{y,z}}G_c$$

for $c \in$ [mean, log-mean]. After the iterations are completed for delay elements, the same procedure for every phase element is repeated. This procedure is repeated until it converges. The convergence is similar to a convergence herein:

$$\left|G_c^n - G_c^{n-1}\right| < \alpha G_c^n, \text{ where } G_c^n$$

is the gain at nth iteration and $\alpha$ is the convergence ratio.

Figure 12:
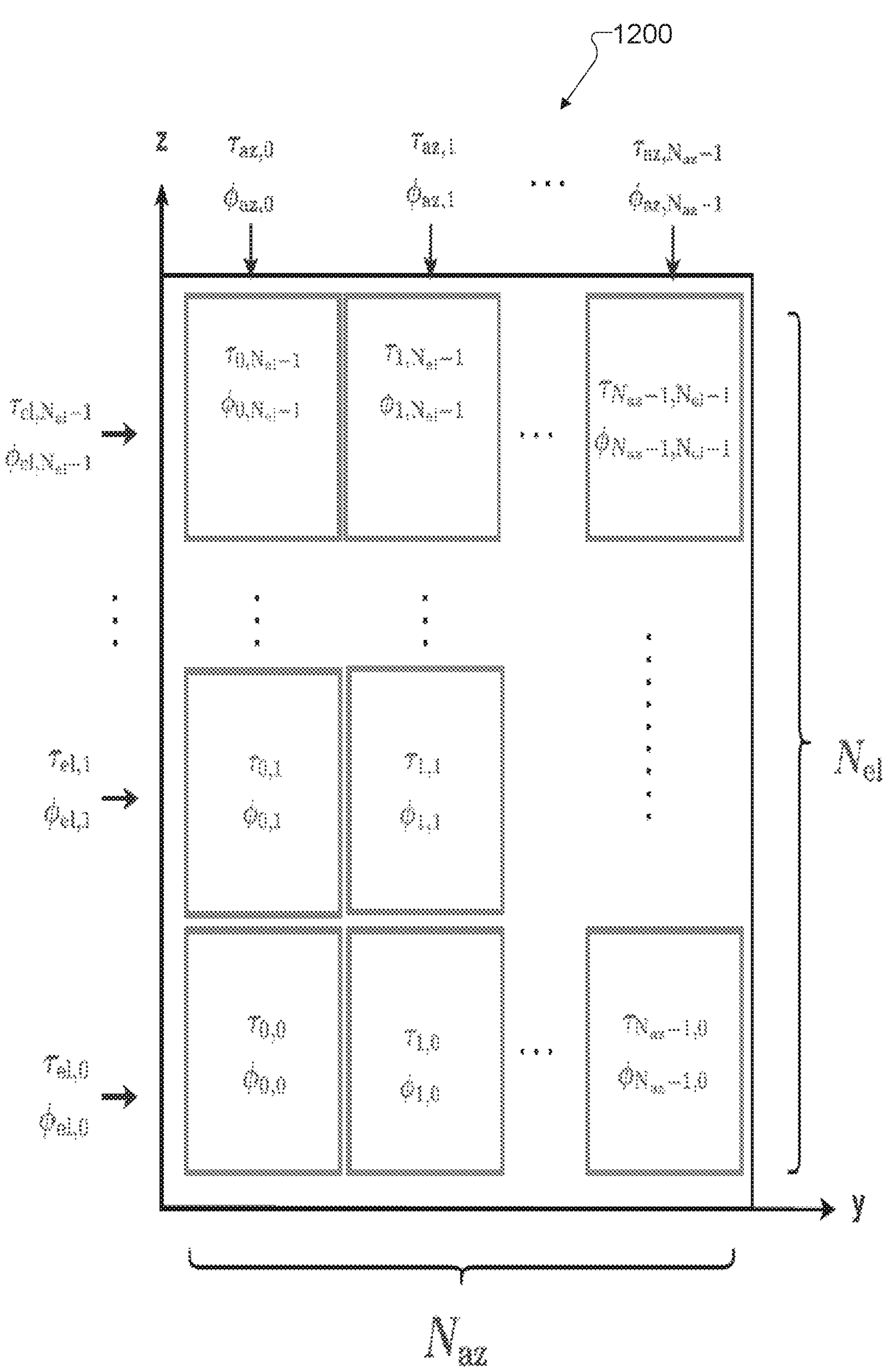
FIG. 12 illustrates a diagram of an example planar array antenna structure according to embodiments of the present disclosure.

FIG. 12 illustrates a diagram of an example planar array antenna structure 1200 according to embodiments of the present disclosure. For example, planar array antenna structure 1200 can be implemented in the BS 102 of FIG. 1. This example is for illustration only and other embodiments can be used without departing from the scope of the present disclosure.

The analytical approach defined herein for joint analytical least squares solution, with reference to FIG. 12, includes $N_{el} \times N_{az}$ different equations to be solved for every delay and phase elements. The present disclosure also evaluates a separated approach to decrease the amount of equations, which is especially helpful in the case of online beam design since it has lower complexity. Every phase and delay value can be denoted as separable by their azimuth and elevation values. This leads to $\tau_{y,z}=\tau_{el,z}+\tau_{az,y}$, in which the delay from elevation (azimuth) is $\tau_{el,z}$ ($\tau_{az,y}$) and $\varphi_{y,z}=\varphi_{el,z}+\varphi_{az,y}$, in which the phase from elevation (azimuth) is $\varphi_{el,z}$ ($\varphi_{az,y}$).

By this definition, various embodiments can define the beamforming gain as $$G(\theta_{az}^m, \theta_{el}^m, f_m) = G_{az}(\theta_{az}^m, \theta_{el}^m, f_m) \times G_{el}(\theta_{el}^m, f_m),$$

where $$G_{az}(\theta_{az}^m, \theta_{el}^m, f_m) = \frac{1}{N_{az}} \left\| \sum_{y=0}^{N_{az}-1} e^{j\varphi_{az,y}+j2\pi f_m \tau_{az,y}} e^{-j\pi \frac{f_m}{f_c} y \sin\theta_{az}^m \sin\theta_{el}^m} \right\|^2$$

$$G_{az}(\theta_{el}^m, f_m) = \frac{1}{N_{el}} \left\| \sum_{z=0}^{N_{el}-1} e^{j\varphi_{el,z}+j2\pi f_m \tau_{el,z}} e^{-j\pi \frac{f_m}{f_c} z \cos\theta_{el}} \right\|^2$$

Therefore, various embodiments can solve the azimuth and elevation values separately since $$G_{az}(\theta_{az}^m, \theta_{el}^m, f_m)$$

and $G_{el}(\theta_{el}, f_m)$ are not dependent on each other.

Similar to the joint optimization, $f_m/f_c \approx 1$ and $\alpha_i \times (M+1)$ subcarriers are assigned to (i)-th user, which means that $$\theta_{az}^m = \theta_{az,i},$$

where $\theta_{az,i}$ is the angle of arrival in azimuth direction for the (i)-th user, for $m \in [\alpha_{i-1}, \alpha_i) \times (M+1)$ and similarly, $$\theta_{el}^m = \theta_{el,i} \cdot \zeta_{az,y}^i = \pi y \sin\theta_{az,i} \sin\theta_{el,i} \text{ and } \zeta_{el,z}^i = \pi z \cos\theta_{el,i}$$

for (i)-th user.

Therefore, maximum gain can be achieved if $$\varphi_{az,y} + 2\pi f_m \tau_{az,y} = \zeta_{az,y}^i$$

for every yth antenna and $$\varphi_{el,z} + 2\pi f_m \tau_{el,z} = \zeta_{el,z}^i$$

for every zth antenna across different frequencies. Therefore, various embodiments can construct two set of equations: $Ax_{az,y}=b_{az,y}$ for yth antenna and $Ax_{el,z}=b_{el,z}$ for zth antenna.

$$A = \begin{bmatrix} 1 & \frac{-M}{2} \\ 1 & \frac{-M}{2}+1 \\ \vdots & \vdots \\ 1 & \frac{M}{2} \end{bmatrix},$$

$$[b_{az,y}]_m = 2\pi k_{az,i} + \zeta_{az,y}^i$$

$$[b_{el,z}]_m = 2\pi k_{el,i} + \zeta_{el,z}^i$$

$$x_{az,y} = [\,\varphi_{az,y} \quad 2\pi\Delta_f \tau_{az,y}\,]^T$$

$$x_{el,z} = [\,\varphi_{el,z} \quad 2\pi\Delta_f \tau_{az,y}\,]^T$$

by using $$k_{az,i} = k_{az,i-1} + \left\lfloor \frac{\zeta_{az,y}^{i-1} - \zeta_{az,y}^i}{2} \right\rceil$$

for i<1 and $k_{az,1}=0$ and $$k_{el,i} = k_{el,i-1} + \left\lfloor \frac{\zeta_{el,z}^{i-1} - \zeta_{el,z}^i}{2} \right\rceil$$

for i>1 and $k_{el,1}=0$ to confirm the difference in between user's antenna array steering vector values are not higher than 2w. Since this is an overdetermined linear system of equations, various embodiments can minimize the norm of the errors, $e_{az,y}=Ax_{az,y}=b_{az,y}$ and $e_{el,z}=Ax_{el,z}=b_{el,z}$.

There are different solutions according to which norm of the error is minimized. Embodiments of the present disclosure provide a least squares solution, which is defined as $$\min_{\tau_{az,y},\varphi_{az,y}} \|e_{az,y}\|^2$$

for azimuth equations and $$\min_{\tau_{el,z},\varphi_{el,z}} \|e_{el,z}\|^2$$

for elevation equations because this method leads to a closed form solution. The closed form solution for least squares approximation is $$x_{az,y}^{LS} = \left(A^T A\right)^{-1} A^T b_{az,y} \text{ and } x_{el,z}^{LS} = \left(A^T A\right)^{-1} A^T b_{el,z}.$$

This leads to the following closed form solutions for phase and delay values $$\varphi_{az,y} = \sum_{i=1}^{N_{users}} \alpha_i\left(\zeta_{az,y}^i + 2\pi k_{az,i}\right)$$

$$\tau_{az,y} = \sum_{i=1}^{N_{users}} \frac{3\alpha_i}{\pi(M+1)\Delta_f}\left(\zeta_{az,y}^i + 2\pi k_{az,i}\right)\sum_{d=1}^{i}(2\alpha_d - \alpha_i - 1)$$

$$\varphi_{el,z} = \sum_{i=1}^{N_{users}} \alpha_i\left(\zeta_{el,z}^i + 2\pi k_{el,i}\right)$$

$$\tau_{el,z} = \sum_{i=1}^{N_{users}} \frac{3\alpha_i}{\pi(M+1)\Delta_f}\left(\zeta_{el,z}^i + 2\pi k_{el,i}\right)\sum_{d=1}^{i}(2\alpha_d - \alpha_i - 1)$$

Separated analytical problem, which is explained herein, can be solved by changing the problem statement to indicate an infinity norm for the error similar to joint analytical solution to ensure the fairness between different users because various embodiments minimize the maximum error. Then for azimuth, the problem becomes $$\min_{\tau_{az,y},\varphi_{az,y}} \|e_{az,y}\|_\infty$$

and for elevation, $$\min_{\tau_{el,z},\varphi_{el,z}} \|e_{el,z}\|_\infty.$$

These two subproblems can be solved iteratively by using CVX tool.

Figure 13:
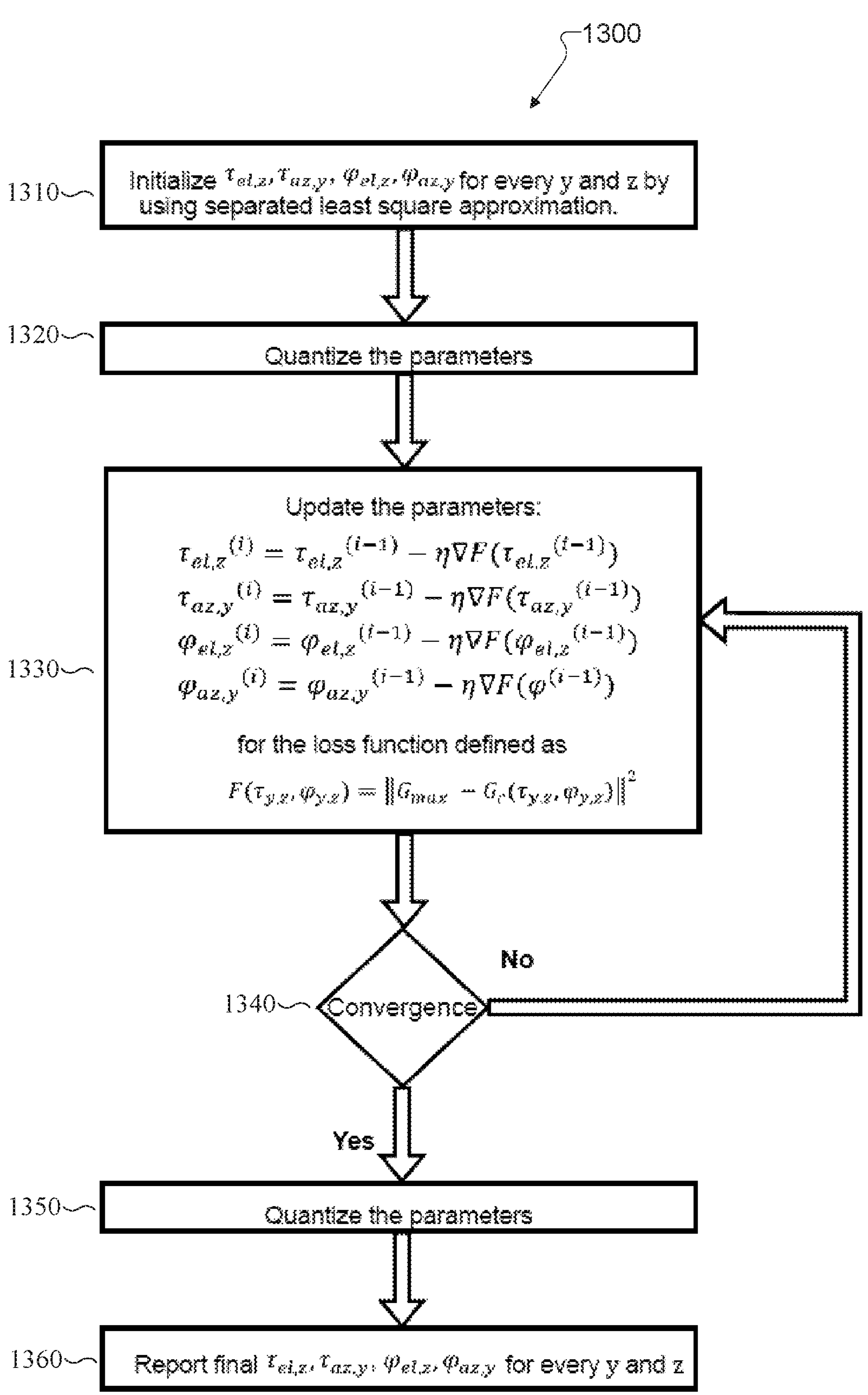
FIG. 13 illustrates a flowchart of an example BS procedure for optimizing parameters for 3D beamforming with JPTA according to embodiments of the present disclosure.

FIG. 13 illustrates a flowchart of an example BS procedure 1300 for optimizing parameters for 3D beamforming with JPTA according to embodiments of the present disclosure. For example, procedure 1300 for optimizing parameters for 3D beamforming with JPTA may be performed by the BS 102 of FIG. 2.

The procedure begins in 1310, $\tau_{el,z}$, $\tau_{az,y}$, $\varphi_{el,z}$, and $\varphi_{az,y}$ are initialized for every y and z by using a separated least square approximation. In 1320, the parameters are quantized. In 1340, parameters $\tau_{el,z}^{(i)}$ $\tau_{az,y}^{(i)}$ $\varphi_{el,z}^{(i)}$ $\varphi_{az,y}^{(i)}$ are updated for the loss function defined as $$F(\tau_{y,z}, \varphi_{y,z}) = \|G_{max} - G_c(\tau_{y,z}, \varphi_{y,z})\|^2$$

In 1340, the procedure may converge. If the procedure does not converge, then the procedure returns to 1330. Otherwise, if the procedure does converge, then, 1350, the parameters are quantized. In 1360, the final $\tau_{el,z}$, $\tau_{az,y}$, $\varphi_{el,z}$, and $\varphi_{az,y}$ for every y and z are reported.

As is used for joint optimization, an iterative approach is used, which is led by their gradients to improve after the separated analytical solution. As an iterative approach, various embodiments benefit from gradient descent algorithm, which is updating the parameters iteratively by using their gradients from the defined loss function. It is important to note that the parameters for the separated gradient descent are $\tau_{az,y}$, $\tau_{el,z}$, $\varphi_{az,y}$ and $\varphi_{el,z}$. The loss function, convergence criteria and the learning rate are the same as the joint gradient descent optimization. With reference to FIG. 13, the diagram of the separated gradient descent optimization is shown.

Figure 14:
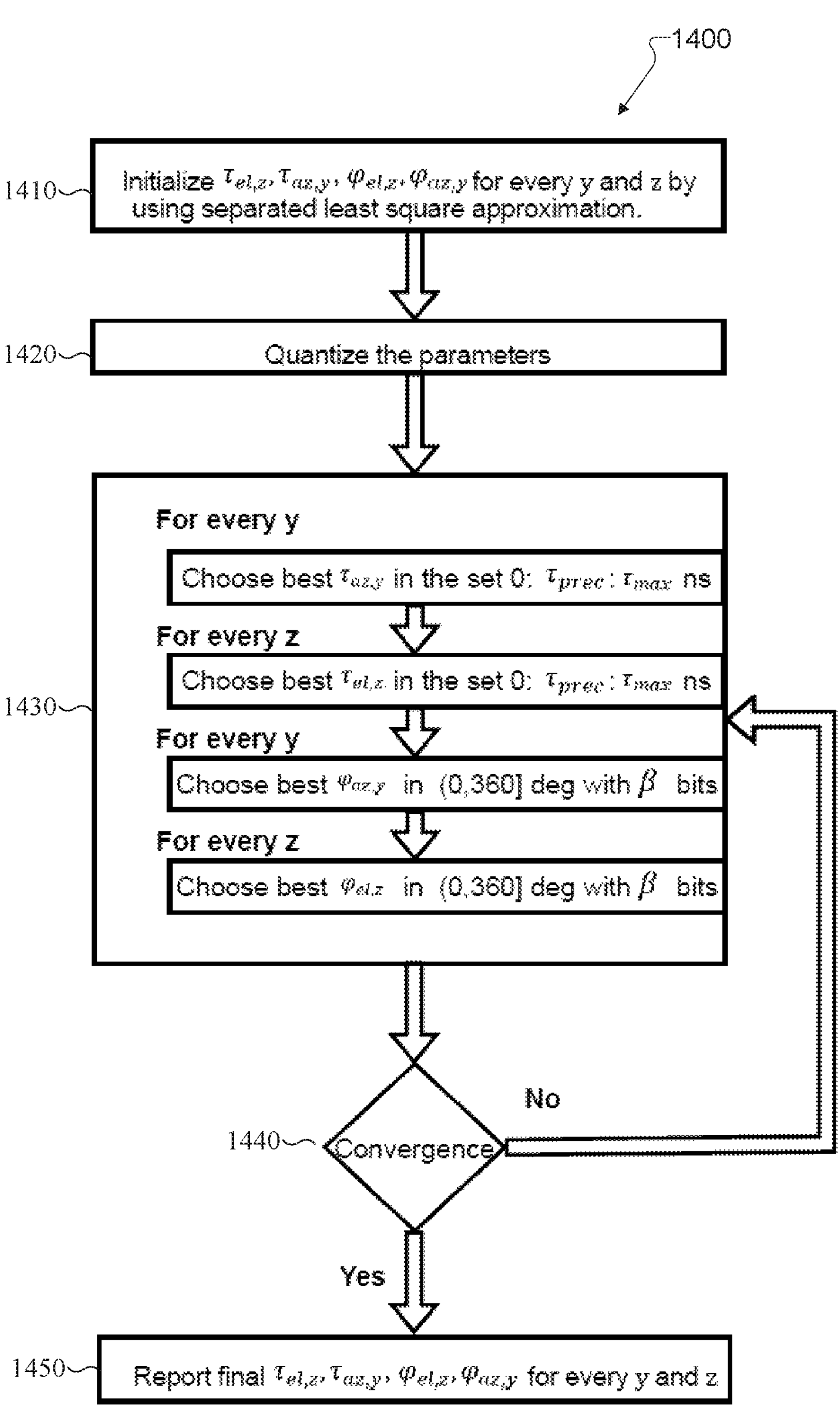
FIG. 14 illustrates a flowchart of an example BS procedure for optimizing parameters for 3D beamforming with JPTA according to embodiments of the present disclosure.

FIG. 14 illustrates a flowchart of an example BS procedure 1400 for optimizing parameters for 3D beamforming with JPTA according to embodiments of the present disclosure. For example, procedure 1400 for optimizing parameters for 3D beamforming with JPTA may be performed by the BS 103 of FIG. 1. This example is for illustration only and other embodiments can be used without departing from the scope of the present disclosure.

The procedure begins in 1410, $\tau_{el,z}$, $\tau_{az,y}$, $\varphi_{el,z}$, and $\varphi_{az,y}$ are initialized for every y and z by using a separated least square approximation. In 1420, the parameters are quantized. In 1430, for every y, the best $\tau_{az,y}$ in the set 0: $\tau_{prec}$: $\tau_{max}$ ns is chosen and the best $\varphi_{az,z}$ in (0,360] deg with β bits is chosen; for every z, the best $\tau_{el,z}$ in the set 0: $\tau_{prec}$: $\tau_{max}$ ns is chosen and the best $\varphi_{el,z}$ in (0,360] deg with β bits is chosen. In 1440, the procedure may converge. If the procedure does not converge, then the procedure returns to 1430. Otherwise, in 1450, the final $\tau_{el,z}$, $\tau_{az,y}$, $\varphi_{el,z}$, and $\varphi_{az,y}$ for every y and z are reported.

To determine a different iterative algorithm to improve the separated least squares approximation, with reference to FIG. 14, a greedy optimization approach is used, which is iteratively updating every phase and delay element. The parameters initialized to start from the separated analytical least squares closed form solutions after a quantization as described herein. The procedure is similar to the joint greedy optimization; however, the parameters are $\tau_{az,y}$, $\tau_{el,z}$, $\varphi_{az,y}$ and $\varphi_{el,z}$. The definition of the loss function and the convergence criteria kept same.

Figure 15:
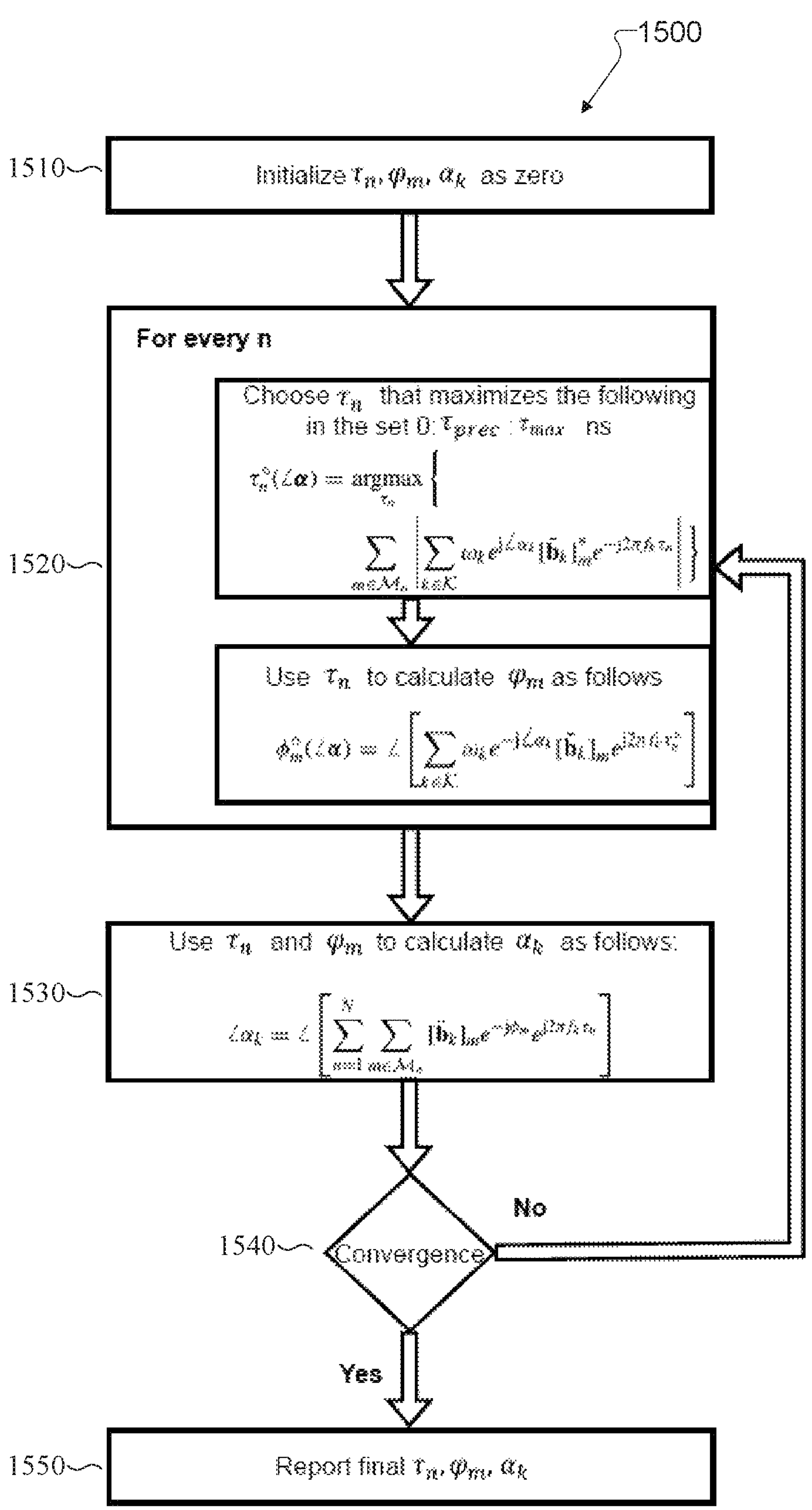
FIG. 15 illustrates a flowchart of an example BS procedure for optimizing parameters for 3D beamforming with JPTA according to embodiments of the present disclosure.

FIG. 15 illustrates a flowchart of an example BS procedure 1500 for optimizing parameters for 3D beamforming with JPTA according to embodiments of the present disclosure. For example, procedure 1500 for optimizing parameters for 3D beamforming with JPTA may be performed by any of the BSs 102-103 of FIG. 1, such as the BS 102. This example is for illustration only and other embodiments can be used without departing from the scope of the present disclosure.

The procedure begins in 1510, $\tau_n$, $\varphi_m$, and $\alpha_k$ are initialized as zero. In 1520, for every n, the $\tau_n$ is chosen which maximizes, in the set $$0 : \tau_{prec} : \tau_{max} \text{ ns } \mathring{\tau}_n,$$

and $\tau_n$ can be used to calculate $\varphi_m$ using $$\mathring{\varphi}_m.$$

In 1530, $\tau_n$ and $\varphi_m$ are used to calculate $\alpha_k$ using $\alpha_k$. In 1540, the procedure may converge. If the procedure does not converge, then the procedure returns to 1530. Otherwise, in 1550, the final, $\tau_n$, $\varphi_m$, and $\alpha_k$ are reported.

Another approach is to construct the problem as an alternating optimization approach, which is implemented for 2D frequency dependent beamforming. Various embodiments extend this approach for 3D frequency dependent beamforming. In this approach, the downlink transmitter signal is defined as $$x_k = \frac{1}{\sqrt{M}} \begin{bmatrix} e^{j\phi_1} & \dots & 0 \\ \vdots & \ddots & \vdots \\ 0 & \dots & e^{j\phi_M} \end{bmatrix} P \begin{bmatrix} e^{-j2\pi f_k \tau_1} \\ \vdots \\ e^{-j2\pi f_k \tau_N} \end{bmatrix} \alpha_k s_k,$$

in which, M is the number of total antenna elements (for case herein, $M=N_{az}\times N_{el}$), $\phi_i$ is the antenna phase shifter of ith antenna, P is an identity matrix since every antenna is expected to have a phase shifter and a true time delay element and $\tau_i$ is the true time delay of ith antenna. This could also be expressed by $x_k=TPd_k\alpha_k s_k$, where phase shifter matrix is T and true time delay vector is $d_k$. The problem formulation for this method is $$\tau^\circ, \phi^\circ, \angle\alpha^\circ = \arg \max_{\tau,\phi,\angle\alpha} \left\{ \sum_{k\in k} \omega_k \, \mathrm{Re}\left[ e^{j\angle\alpha_k} b_k^* TPd_k \right] \right\},$$

where $b_k$ is the desired beamforming vector and $\omega_k$ is the weights for kth subcarrier frequency. To extend, the desired beamforming vector is updated. Definition of the original beamforming vector is $$b_k = \sqrt{\frac{P_{sum}}{MK}} a_R(\theta_0 + k\Delta\theta/K)$$

for an array steering vector defined as $$\left[a_R(\theta^k, f_k)\right]_{y,z} = e^{-j\pi \frac{f_k}{f_c} y \sin\theta^k}.$$

In this case, the array steering vector is defined as following $$\left[a_R(\theta_{az}^k, \theta_{el}^k, f_k)\right]_{y,k} = e^{-j\pi \frac{f_k}{f_c}(y \sin\theta_{az}^k, \sin\theta_{el}^k + z \cos\theta_{el}^k)}$$

which provide similar to results herein. With reference to FIG. 15, the convergence criterion is kept the same.

For the iterative processes disclosed herein, the processes may continue and be performed iteratively until reaching a stopping condition. For example, the stopping condition may be convergence as discussed herein, a predetermined limit on number of iterations, and/or deviation from previous iteration being less than a predefined threshold.

Figure 16:
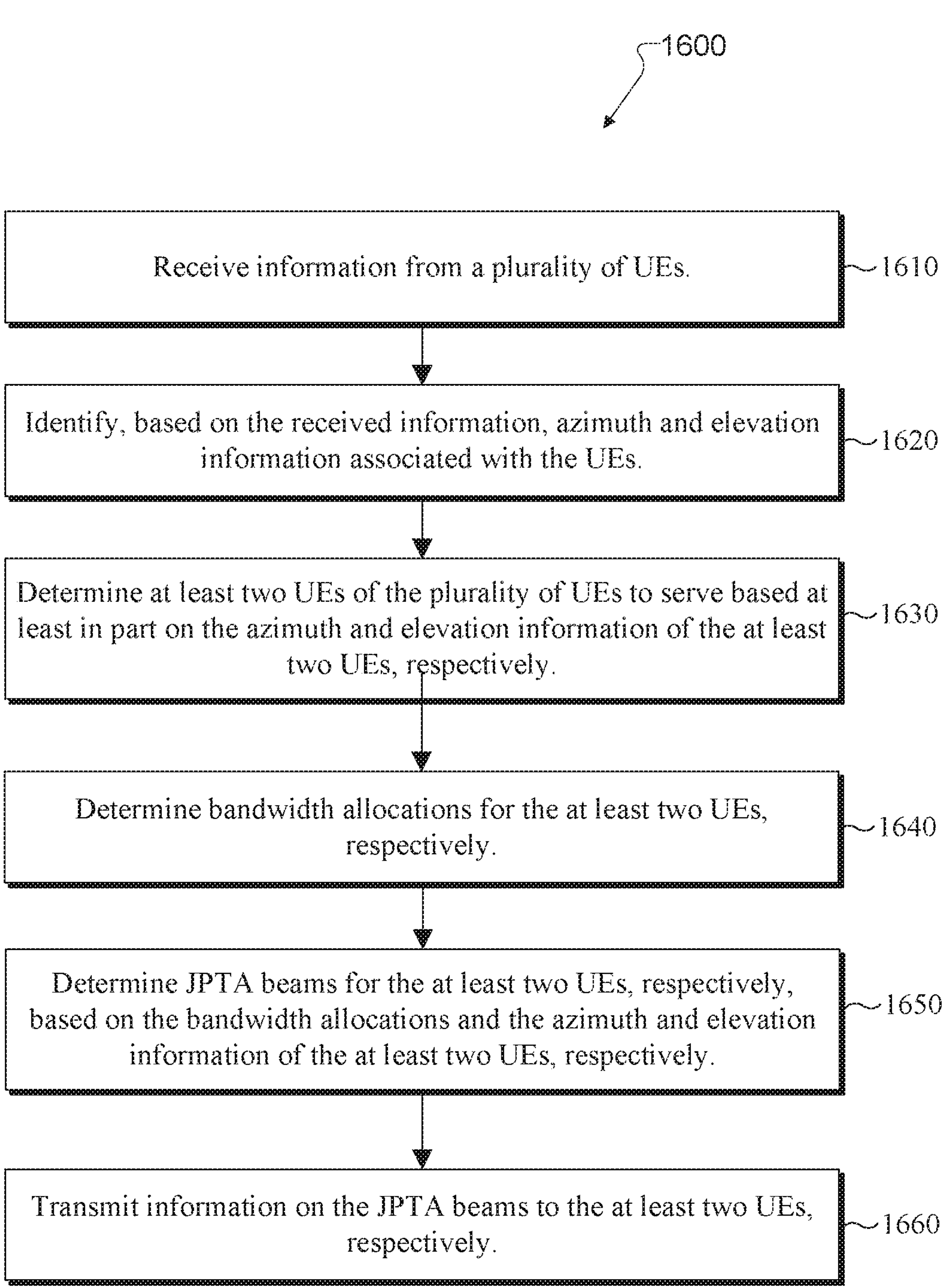
FIG. 16 illustrates an example procedure performed by a BS in a wireless communication system according to embodiments of the present disclosure.

FIG. 16 illustrates an example procedure 1600 performed by a BS in a wireless communication system according to embodiments of the present disclosure. For example, method 1600 may be performed by any of the BSs 102 or 103 of FIG. 1, such as the BS 102 of FIG. 2. This example is for illustration only and other embodiments can be used without departing from the scope of the present disclosure.

The procedure begins in 1610 with the BS receiving information from a plurality of UEs.

In 1620, the BS identifies, based on the received information, azimuth and elevation information associated with the UEs. For example, azimuth and elevation angles of a first of the JPTA beams may be different than azimuth and elevation angles of a second of the JPTA beams.

In 1630, the BS determines at least two UEs of the plurality of UEs to serve based at least in part on the azimuth and elevation information of the at least two UEs, respectively.

In 1640, the BS determines bandwidth allocations for the at least two UEs, respectively. For example, the bandwidth allocations for the at least two UEs may be different.

In 1650, the BS determines JPTA beams for the at least two UEs, respectively, based on the bandwidth allocations and the azimuth and elevation information of the at least two UEs, respectively. In various embodiments, the BS may determine an array steering vector and determine a beamforming vector.

In various embodiments, the BS may assign one or more subcarriers to one or more of the at least two UEs. In various embodiments, the BS may determine linear systems of equations for an antenna element located at position (y, z) on an antenna array of the BS. For example, the linear system of equations may be overdetermined.

In various embodiments, the BS may determine a largest gain for the antenna across different frequencies based on $$\varphi_{y,z} + 2\pi f_m \tau_{y,z} = \zeta_{y,z}^i.$$

For example, $\varphi_{y,z}$ is a phase delay, $\tau_{y,z}$ is a time delay, $f_m$ is a m-th subcarrier frequency, and $$\zeta_{y,z}^i \triangleq \pi(y \sin\theta_{az,i} \sin\theta_{el,i} + z \cos [\![\theta_{el,i})]\!].$$

In various embodiments, the BS may reduce a norm of error of the linear systems of equations.

In various embodiments, the BS may identify a different norm of error of the linear systems of equations. For example, the different norm of error of the linear systems of equations may be based on $\|e\|_\infty=\max_i|e_i|$. In various embodiments, the BS may reduce a norm of an error using $\min_{\tau_{y,z},\varphi_{y,z}}\|e\|_\infty$. For example, $\varphi_{y,z}$ is a phase delay for an antenna element at position (y, z) in an antenna array of the BS and $\tau_{y,z}$ is a time delay for an antenna element at the position (y, z) in the antenna array of the BS.

In various embodiments, the BS may quantize $\tau_{y,z}$ and $\varphi_{y,z}$. $\varphi_{y,z}$ is a phase delay for an antenna element at position (y, z) in an antenna array of the BS and $\tau_{y,z}$ is a time delay for the antenna element at position (y, z) in the antenna array of the BS. In various embodiments, the BS may apply a gradient descent update to $\tau_{y,z}$ and $\varphi_{y,z}$ based on a loss function. In various embodiments, the BS may quantize $\tau_{y,z}$ and $\varphi_{y,z}$ based on application of the gradient descent update. In various embodiments, the BS may make phase delay ranges for $\tau_{y,z}$ from 0 to $\tau_{max}$ and repeat quantization of $\tau_{y,z}$ and $\varphi_{y,z}$ based on application of the gradient descent update until at least a maximum number of updates is reached or when until a stopping criterion is reached.

In various embodiments, the BS may quantize at least one of (i) one or more time delay elements $\tau_{y,z}$ or (ii) one or more phase delay elements $\varphi_{y,z}$. For example, $\varphi_{y,z}$ is a phase delay for an antenna element at position (y, z) in an antenna array of the BS and $\tau_{y,z}$ is a time delay for an antenna element at the position (y, z) in the antenna array of the BS. In various embodiments, the BS may measure performance of at least one of (i) each quantized time delay element $\tau_{y,z}$ from a set of one or more time delay elements based on mean gain and log-mean gain or (ii) each quantized phase delay element $\varphi_{y,z}$, from a set of one or more phase delay elements based on mean gain and log-mean gain. In various embodiments, the BS may determine at least one of (i) time delay element $\tau_{y,z}$ for each antenna element based on performance or (ii) phase delay element $\varphi_{y,z}$ for each antenna element based on performance.

In 1660, the BS transmits information on the JPTA beams to the at least two UEs, respectively.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A base station (BS) comprising:

a transceiver configured to receive information from a plurality of user equipment (UEs); and a processor operably coupled to the transceiver, the processor configured to:

identify, based on the received information, azimuth and elevation information associated with the UEs;

determine at least two UEs of the plurality of UEs to serve based at least in part on the azimuth and elevation information of the at least two UEs, respectively;

determine bandwidth allocations for the at least two UEs, respectively; and determine joint-phase-time array (JPTA) beams for the at least two UEs, respectively, based on the bandwidth allocations and the azimuth and elevation information of the at least two UEs, respectively, wherein the transceiver is further configured to transmit information on the JPTA beams to the at least two UEs, respectively.

2. The BS of claim 1, wherein azimuth and elevation angles of a first of the JPTA beams are different than azimuth and elevation angles of a second of the JPTA beams.

3. The BS of claim 1, wherein the bandwidth allocations for the at least two UEs are different.

4. The BS of claim 1, wherein to determine the JPTA beams for the at least two UEs, the processor is further configured to:

determine an array steering vector;

determine a beamforming vector;

assign one or more subcarriers to one or more of the at least two UEs;

determine linear systems of equations for an antenna element located at position (y, z) on an antenna array of the BS, wherein the linear systems of equations is overdetermined;

determine a largest gain for the antenna across different frequencies based on $$\varphi_{y,z} + 2\pi f_m \tau_{y,z} = \zeta^i_{y,z},$$

wherein $\varphi_{y,z}$ is a phase delay, $\tau_{y,z}$ is a time delay, $f_m$ is a m-th subcarrier frequency, and $$\zeta^i_{y,z} = \Delta\pi(y \sin\theta_{az,i} \sin\theta_{el,i} + z\cos\theta_{el,i});$$

and reduce a norm of error of the linear systems of equations.

5. The BS of claim 4, wherein to determine the JPTA beams for the at least two UEs, the processor is further configured to:

identify a different norm of error of the linear systems of equations, wherein the different norm of error of the linear systems of equations is based on $\|e\|_\infty=\max_i|e_i|$; and reduce a norm of an error using $$\min_{\tau_{y,z},\varphi_{y,z}} \|e\|_\infty,$$

wherein $\varphi_{y,z}$ is a phase delay for an antenna element at position (y, z) in an antenna array of the BS and $\tau_{y,z}$ is a time delay for an antenna element at the position (y, z) in the antenna array of the BS.

6. The BS of claim 1, wherein to determine the JPTA beams for the at least two UEs, the processor is further configured to:

quantize $\tau_{y,z}$ and $\varphi_{y,z}$, $\varphi_{y,z}$ is a phase delay for an antenna element at position (y, z) in an antenna array of the BS and $\tau_{y,z}$ is a time delay for the antenna element at position (y, z) in the antenna array of the BS;

apply a gradient descent update to $\tau_{y,z}$ and $\varphi_{y,z}$ based on a loss function;

quantize $\tau_{y,z}$ and $\varphi_{y,z}$ based on application of the gradient descent update;

make phase delay ranges for $\tau_{y,z}$ from 0 to $\tau_{max}$ quantization of $\tau_{y,z}$ and $\varphi_{y,z}$ based on application of the gradient descent update until at least a maximum number of updates is reached or when until a stopping criterion is reached.

7. The BS of claim 1, wherein to determine the JPTA beams for the at least two UEs, the processor is further configured to, iteratively until reaching a stopping condition:

quantize at least one of (i) one or more time delay elements $\tau_{y,z}$ or (ii) one or more phase delay elements $\varphi_{y,z}$, wherein $\varphi_{y,z}$ is a phase delay for an antenna element at position (y, z) in an antenna array of the BS and $\tau_{y,z}$ is a time delay for an antenna element at the position (y, z) in the antenna array of the BS;

measure performance of at least one of (i) each quantized time delay element $\tau_{y,z}$ from a set of one or more time delay elements based on mean gain and log-mean gain or (ii) each quantized phase delay element $\varphi_{y,z}$, from a set of one or more phase delay elements based on mean gain and log-mean gain; and determine at least one of (i) time delay element $\tau_{y,z}$ for each antenna element based on performance or (ii) phase delay element $\varphi_{y,z}$ for each antenna element based on performance.

8. A method performed by a base station (BS), the method comprising:

receiving information from a plurality of user equipment (UEs);

identifying, based on the received information, azimuth and elevation information associated with the UEs;

determining at least two UEs of the plurality of UEs to serve based at least in part on the azimuth and elevation information of the at least two UEs, respectively;

determining bandwidth allocations for the at least two UEs, respectively;

determining joint-phase-time array (JPTA) beams for the at least two UEs, respectively, based on the bandwidth allocations and the azimuth and elevation information of the at least two UEs, respectively; and transmitting information on the JPTA beams to the at least two UEs, respectively.

9. The method of claim 8, wherein azimuth and elevation angles of a first of the JPTA beams are different than azimuth and elevation angles of a second of the JPTA beams.

10. The method of claim 8, wherein the bandwidth allocations for the at least two UEs are different.

11. The method of claim 8, wherein determining the JPTA beams for the at least two UEs further comprises:

determining an array steering vector;

determining a beamforming vector;

assigning one or more subcarriers to one or more of the at least two UEs;

determining linear systems of equations for an antenna element located at position (y, z) on an antenna array of the BS, wherein the linear systems of equations is overdetermined;

determining a largest gain for the antenna across different frequencies based on $$\varphi_{y,z} + 2\pi f_m \tau_{y,z} = \zeta^i_{y,z},$$

wherein $\varphi_{y,z}$ is a phase delay, $\tau_{y,z}$ is a time delay, $f_m$ is a m-th subcarrier frequency, and $$\zeta^i_{y,z} \triangleq \pi\pi(y \sin\theta_{az,i} \sin\theta_{el,i} + z\cos\theta_{el,i});$$

and reducing a norm of error of the linear systems of equations.

12. The method of claim 11, wherein determining the JPTA beams for the at least two UEs further comprises:

identifying a different norm of error of the linear systems of equations, wherein the different norm of error of the linear systems of equations is based on $\|e\|_\infty = \max_i |e_i|$; and reducing a norm of an error using $$\min_{\tau_{y,z},\varphi_{y,z}} \|e\|_\infty,$$

wherein $\varphi_{y,z}$ is a phase delay for an antenna element at position (y, z) in an antenna array of the BS and $\tau_{y,z}$ is a time delay for an antenna element at the position (y, z) in the antenna array of the BS.

13. The method of claim 8, wherein determining the JPTA beams for the at least two UEs further comprises:

quantizing $\tau_{y,z}$ and $\varphi_{y,z}$, $\varphi_{y,z}$ is a phase delay for an antenna element at position (y, z) in an antenna array of the BS and $\tau_{y,z}$ is a time delay for the antenna element at position (y, z) in the antenna array of the BS;

applying a gradient descent update to $\tau_{y,z}$ and $\varphi_{y,z}$ based on a loss function;

quantizing $\tau_{y,z}$ and $\varphi_{y,z}$ based on application of the gradient descent update;

making phase delay ranges for $\tau_{y,z}$ from 0 to $\tau_{max}$ quantization of $\tau_{y,z}$ and $\varphi_{y,z}$ based on application of the gradient descent update until at least a maximum number of updates is reached or when until a stopping criterion is reached.

14. The method of claim 8, wherein determining the JPTA beams for the at least two UEs, further comprises, iteratively until reaching a stopping condition:

quantizing at least one of (i) one or more time delay elements $\tau_{y,z}$ or (ii) one or more phase delay elements $\varphi_{y,z}$, wherein $\varphi_{y,z}$ is a phase delay for an antenna element at position (y, z) in an antenna array of the BS and $\tau_{y,z}$ is a time delay for an antenna element at the position (y, z) in the antenna array of the BS;

measuring performance of at least one of (i) each quantized time delay element $\tau_{y,z}$ from a set of one or more time delay elements based on mean gain and log-mean gain or (ii) each quantized phase delay element $\varphi_{y,z}$, from a set of one or more phase delay elements based on mean gain and log-mean gain; and determining at least one of (i) time delay element $\tau_{y,z}$ for each antenna element based on performance or (ii) phase delay element $\varphi_{y,z}$ for each antenna element based on performance.

15. A non-transitory computer readable medium comprising program code that, when executed by a processor of a base station (BS), causes the BS to:

receive information from a plurality of user equipment (UEs);

identify, based on the received information, azimuth and elevation information associated with the UEs;

determine at least two UEs of the plurality of UEs to serve based at least in part on the azimuth and elevation information of the at least two UEs, respectively;

determine bandwidth allocations for the at least two UEs, respectively;

determine joint-phase-time array (JPTA) beams for the at least two UEs, respectively, based on the bandwidth allocations and the azimuth and elevation information of the at least two UEs, respectively; and transmit information on the JPTA beams to the at least two UEs, respectively.

16. The non-transitory computer readable medium of claim 15, wherein azimuth and elevation angles of a first of the JPTA beams are different than azimuth and elevation angles of a second of the JPTA beams.

17. The non-transitory computer readable medium of claim 15, wherein the bandwidth allocations for the at least two UEs are different.

18. The non-transitory computer readable medium of claim 15, wherein the program code that, when executed by the processor, causes the BS to determine the JPTA beams for the at least two UEs, further comprises program code that, when executed by the processor, causes the BS to:

determine an array steering vector;

determine a beamforming vector;

assign one or more subcarriers to one or more of the at least two UEs;

determine linear systems of equations for an antenna element located at position (y, z) on an antenna array of the BS, wherein the linear systems of equations is overdetermined;

determine a largest gain for the antenna across different frequencies based on $$\varphi_{y,z} + 2\pi f_m \tau_{y,z} = \zeta^i_{y,z},$$

wherein $\varphi_{y,z}$ is a phase delay, $\tau_{y,z}$ is a time delay, $f_m$ is a m-th subcarrier frequency, and $$\zeta^i_{y,z} \triangleq \pi(y \sin\theta_{az,i} \sin\theta_{el,i} + z \cos\theta_{el,i});$$

and reduce a norm of error of the linear systems of equations.

19. The non-transitory computer readable medium of claim 18, wherein the program code that, when executed by the processor, causes the BS to determine the JPTA beams for the at least two UEs, further comprises program code that, when executed by the processor, causes the BS to:

identify a different norm of error of the linear systems of equations, wherein the different norm of error of the linear systems of equations is based on $\|e\|_\infty = \max_i |e_i|$; and reduce a norm of an error using $$\min_{\tau_{y,z},\varphi_{y,z}} \|e\|_\infty,$$

wherein $\varphi_{y,z}$ is a phase delay for an antenna element at position (y, z) in an antenna array of the BS and $\tau_{y,z}$ is a time delay for an antenna element at the position (y, z) in the antenna array of the BS.

20. The non-transitory computer readable medium of claim 15, wherein the program code that, when executed by the processor, causes the BS to determine the JPTA beams for the at least two UEs, further comprises program code that, when executed by the processor, causes the BS to:

quantize $\tau_{y,z}$ and $\varphi_{y,z}$, $\varphi_{y,z}$ is a phase delay for an antenna element at position (y, z) in an antenna array of the BS and $\tau_{y,z}$ is a time delay for the antenna element at position (y, z) in the antenna array of the BS;

apply a gradient descent update to $\tau_{y,z}$ and $\varphi_{y,z}$ based on a loss function;

quantize $\tau_{y,z}$ and $\varphi_{y,z}$ based on application of the gradient descent update;

make phase delay ranges for $\tau_{y,z}$ from 0 to $\tau_{max}$ quantization of $\tau_{y,z}$ and $\varphi_{y,z}$ based on application of the gradient descent update until at least a maximum number of updates is reached or when until a stopping criterion is reached.

* * * * *